US009751572B2

(12) United States Patent
Higashiguchi et al.

(10) Patent No.: US 9,751,572 B2
(45) Date of Patent: Sep. 5, 2017

(54) WORKING VEHICLE

(71) Applicant: YANMAR CO., LTD., Osaka (JP)

(72) Inventors: Gaku Higashiguchi, Osaka (JP); Tsutomu Takahashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 22 days.

(21) Appl. No.: 14/907,995

(22) PCT Filed: Jul. 31, 2014

(86) PCT No.: PCT/JP2014/070244
§ 371 (c)(1),
(2) Date: Jan. 27, 2016

(87) PCT Pub. No.: WO2015/019943
PCT Pub. Date: Feb. 12, 2015

(65) Prior Publication Data
US 2016/0167719 A1  Jun. 16, 2016

(30) Foreign Application Priority Data

Aug. 9, 2013 (JP) .................................. 2013-166349
Aug. 9, 2013 (JP) .................................. 2013-166350

(51) Int. Cl.
*B60K 26/00* (2006.01)
*B62D 33/06* (2006.01)
(Continued)

(52) U.S. Cl.
CPC ............ *B62D 33/06* (2013.01); *A01B 63/002* (2013.01); *A01B 63/10* (2013.01);
(Continued)

(58) Field of Classification Search
CPC ... A01B 63/10; A01B 63/1115; A01B 63/002; A01B 33/024; B60K 20/02; B60K 17/10;
(Continued)

(56) References Cited

U.S. PATENT DOCUMENTS 4,200,166 A    4/1980  Hansen
5,938,282 A *  8/1999  Epple .................. B60N 2/4693
                                              180/315
(Continued)

FOREIGN PATENT DOCUMENTS

FR    2388692       11/1978
JP    53-133831     11/1978
(Continued)

*Primary Examiner* — Toan C To
(74) *Attorney, Agent, or Firm* — Norris McLaughlin & Marcus, P.A.

(57) ABSTRACT

It is an object to secure a state where an operator easily reaches various operating means with a hand, and to reliably maintain an original function of an arm rest (to put the hand on the arm for rest). A working vehicle is configured such that speed of power from an engine provided in a traveling machine body is changed by a hydraulic continuously variable transmission, and the power is transmitted to a traveling unit and a working unit. An arm rest on which the operator's arm and hand are put is placed on a side of a cockpit in the traveling machine body. A main transmission lever which changes traveling speed by the traveling unit is arranged on a front end of the arm rest on the side of the cockpit. An elevating dial which hoists and lowers the working unit is arranged on a side surface of the arm rest on the opposite side from the cockpit.

5 Claims, 13 Drawing Sheets

(51) Int. Cl.
  *A01B 63/10* (2006.01)
  *B60K 20/02* (2006.01)
  *B60N 2/46* (2006.01)
  *A01B 63/111* (2006.01)
  *A01B 63/00* (2006.01)
  *G05G 1/06* (2006.01)
  *G05G 9/047* (2006.01)
  *A01B 33/02* (2006.01)
  *B60K 17/10* (2006.01)

(52) U.S. Cl.
  CPC .......... *A01B 63/1115* (2013.01); *B60K 20/02* (2013.01); *B60N 2/468* (2013.01); *B60N 2/4693* (2013.01); *A01B 33/024* (2013.01); *B60K 17/10* (2013.01); *B60Y 2200/221* (2013.01); *G05G 1/06* (2013.01); *G05G 9/04788* (2013.01)

(58) Field of Classification Search
  CPC ...... B60N 2/4693; B60N 2/468; B62D 33/06; G05G 1/06; G05G 9/04788; B60Y 2200/221
  USPC ................ 180/321, 322, 324, 331, 333, 336
  See application file for complete search history.

(56) References Cited

U.S. PATENT DOCUMENTS

| | | | |
|---|---|---|---|
| 6,164,285 A * | 12/2000 | Garberg | B60K 20/00 180/324 |
| 7,757,806 B2 * | 7/2010 | Bower | B60N 2/06 180/326 |
| 8,483,914 B2 * | 7/2013 | Copeland | B60N 2/0232 701/50 |
| 9,213,333 B2 * | 12/2015 | Harrison | G05D 1/0038 |
| 9,315,103 B2 * | 4/2016 | Yamauchi | B60K 26/02 |
| 2003/0230447 A1* | 12/2003 | Wulfert | B60N 2/143 180/329 |
| 2006/0061177 A1* | 3/2006 | Billger | A47C 3/18 297/344.21 |
| 2009/0242302 A1* | 10/2009 | Fujiki | A01B 51/026 180/89.12 |
| 2012/0073895 A1* | 3/2012 | Nishi | B60N 2/24 180/336 |
| 2016/0033033 A1* | 2/2016 | Komatsu | B60K 35/00 74/473.19 |
| 2016/0033038 A1* | 2/2016 | Kobayashi | F16H 63/42 701/64 |
| 2016/0053779 A1* | 2/2016 | Komatsu | F15B 11/16 60/327 |

FOREIGN PATENT DOCUMENTS

| | | |
|---|---|---|
| JP | 57-69022 | 4/1982 |
| JP | 2002-120771 | 4/2002 |
| JP | 2008-037411 | 2/2008 |
| JP | 2008-254536 | 10/2008 |
| JP | 2010-374869 | 12/2010 |
| JP | 2012-071736 | 4/2012 |
| JP | 2012-087747 | 5/2012 |
| WO | 2010/064541 A1 | 6/2010 |

* cited by examiner

WORKING VEHICLE

TECHNICAL FIELD

The present invention relates to a working vehicle such as an agricultural tractor and a civil engineering wheel loader.

BACKGROUND OF THE INVENTION

In some of conventional tractors as working vehicles, a plurality of working system operating means for setting and adjusting operation states of a traveling machine body and a rotary cultivator are collectively arranged on an upper surface of an arm rest which is arranged on at least one of right and left sides of a cockpit. Patent Document 1 discloses one example of a tractor having such a configuration. In the tractor of Patent Document 1, an working machine elevating lever (working unit position lever) which is working system operating means is arranged on an arm rest located on a right side of a cockpit in a traveling direction, and a throttle lever (main transmission lever) which is traveling system operating means is arranged on an outer side of the arm rest with respect to the cockpit.

CITATION LIST

Patent Document 1: Japanese Patent Application Laid-open No. 2008-037411

SUMMARY OF THE INVENTION

According to the configuration of Patent Document 1, however, since the traveling system operating means is arranged at a position separated away from the cockpit, it is necessary for an operator to largely move his or her hand from a steering wheel whenever a traveling speed of the working vehicle is changed, and operability of the working vehicle is poor. Further, although the working system operating means are arranged on the arm rest, the traveling system operating means is arranged on the outer side of the arm rest. Therefore, when the operator operates the traveling system operating means, the operator needs to move at least an elbow and onward, and the arm rest hinders depending upon an operating attitude.

In view of the above problem, it is an object of the present invention to reliably maintain original functions of an arm rest (rest arm function) while keeping a state where an operator's hand can easily reach various operating means.

A first aspect of the present invention provides a working vehicle in which speed of power from an engine provided in a traveling machine body is changed by a hydraulic continuously variable transmission and transmitted to a traveling unit and a working unit, and an arm rest on which an arm and a hand of an operator are put is placed lateral to a cockpit in the traveling machine body, wherein a main transmission lever for changing traveling speed by the traveling unit is arranged on a front end of the arm rest close to the cockpit, and an elevating dial for hoisting and lowering the working unit is arranged on a side surface of the arm rest on an opposite side from the cockpit.

According to a second aspect of the invention, in the working vehicle of the first aspect, the main transmission lever projects front the front end of the arm rest on the side of the cockpit, and a front surface of the arm rest is formed into a curved surface corresponding to a turning locus of the main transmission lever.

According to a third aspect of the invention, in the working vehicle of the first or second aspect, the elevating dial is fitted to a side surface of the arm rest such that an upper end of the elevating dial is located lower than an upper surface of the arm rest, a side notch for operating a dial is provided in the side surface of the arm rest above an installation region of the elevating dial, an operating projection is provided above the elevating dial, and front and rear step portions of the side notch are brought into abutment against the operating projection, thereby configuring the step portions as a rotation-restricting portion which restricts rotation of the elevating dial.

According to a fourth aspect of the invention, in the working vehicle of any one of the first to third aspects, a rear portion of the arm rest is parallel to the cockpit, and a front portion of the arm rest is separated from the cockpit toward a front end.

According to a fifth aspect of the invention, in the working vehicle of any one of the first to fourth aspects, arranged on the upper surface of the arm rest at a position behind the main transmission lever and on the side of the cockpit are a setting dial for setting a value of maximum speed of the traveling speed or a maximum rotation number of the engine, and a selecting switch for selecting whether the value set by the setting dial is the maximum speed of the traveling speed and the maximum rotation number of the engine.

According to the invention of the present application, a main transmission lever for changing traveling speed by the traveling unit is arranged on a front end of the arm rest close to the cockpit, and an elevating dial for hoisting and lowering the working unit is arranged on a side surface of the arm rest on an opposite side from the cockpit. Therefore, positions where the traveling system operating means and the working system operating means are arranged are close to the operator, and operability of the traveling system operating means and the working system operating means is excellent. The main transmission lever of the traveling system operating means is formed as a lever type operating tool, and the elevating dial of the working system operating means is formed as a dial type operating tool. Thus, even when the operator operates the working vehicle, it is easy to discriminate between the traveling system operating means and the working system operating means, and wrong operation can be prevented.

Further, the main transmission lever projects front the front end of the arm rest on the side of the cockpit, and a front surface of the arm rest is formed into a curved surface corresponding to a turning locus of the main transmission lever. Therefore, since the operator's hand grasping an upper end (grasping portion) of the main transmission lever does not come into contact with the arm rest, the operator can smoothly operate the main transmission lever.

Further, the elevating dial is fitted to a side surface of the arm rest such that an upper end of the elevating dial is located lower than an upper surface of the arm rest, a side notch for operating a dial is provided in the side surface of the arm rest above an installation region of the elevating dial, an operating projection is provided above the elevating dial, and front and rear step portions of the side notch are brought into abutment against the operating projection, thereby configuring the step portions as a rotation-restricting portion which restricts rotation of the elevating dial. Therefore, when the main transmission lever is operated, it is possible to prevent the operator from unintentionally touching the elevating dial, and when the elevating dial is operated, it is possible to restrict the rotation region within a predetermined width, and it is possible to prevent the operator from excessively operating the elevating dial.

Further, a rear portion of the arm rest is parallel to the cockpit, and a front portion of the arm rest is separated from the cockpit toward a front end. Therefore, there are effects that the operability (handling performance) of the traveling system operating means and the working system operating means are excellent, and it is possible to reliably support the operator's arm while preventing the operator's knee from touching the operating means.

Further, arranged on the upper surface of the arm rest at a position behind the main transmission lever and on the side of the cockpit are a setting dial for setting a value of maximum speed of the traveling speed or a maximum rotation number of the engine, and a selecting switch for selecting whether the value set by the setting dial is the maximum speed of the traveling speed and the maximum rotation number of the engine. Therefore, since the main transmission lever, the setting dial and the selecting switch which are the traveling system operating means are collectively arranged close to the operator in the cockpit, and operability (handling performance) thereof is excellent.

DESCRIPTION OF TH PREFERRED EMBODIMENTS

Figure 1:
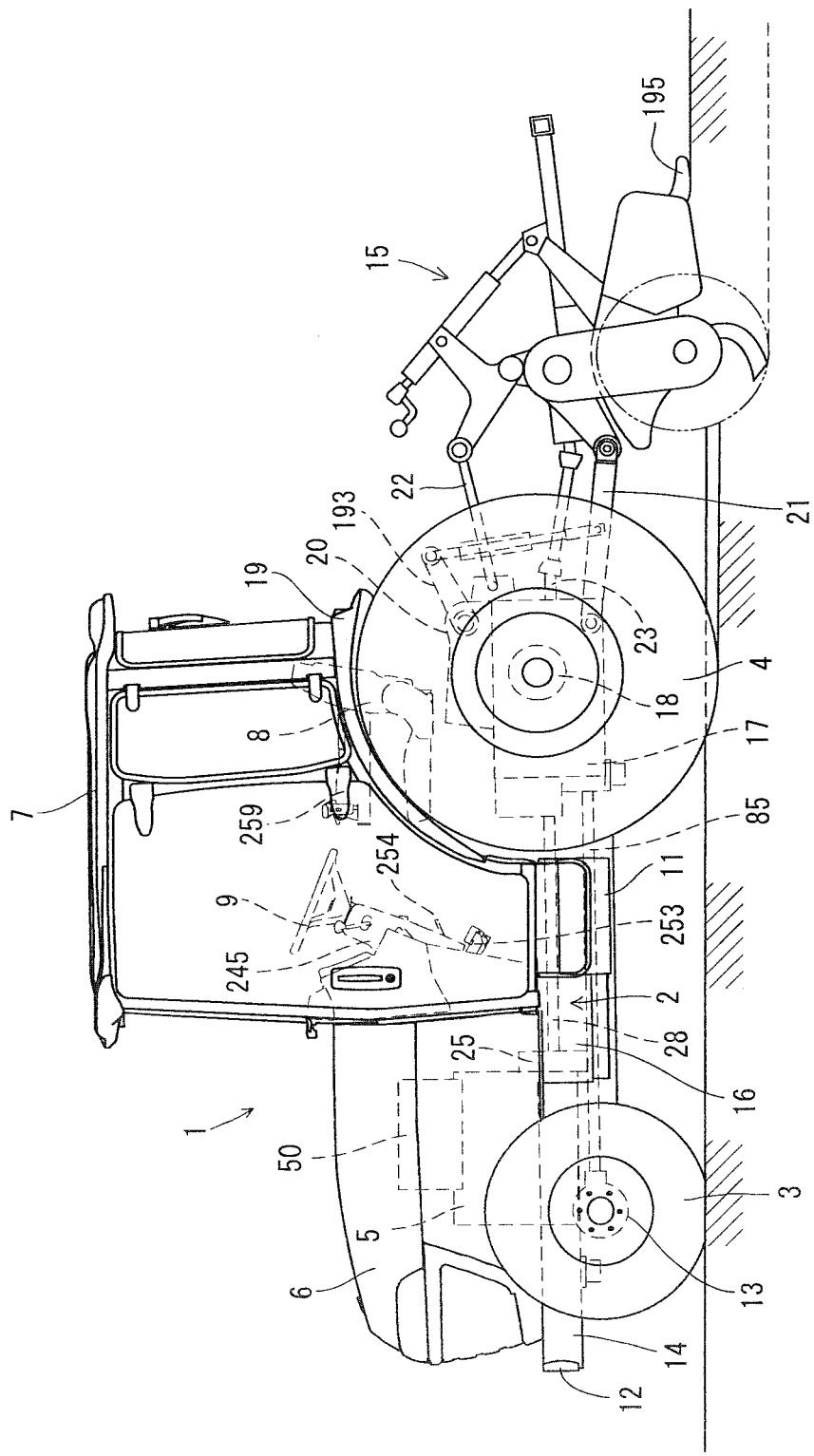
FIG. 1 is a left side view of a tractor.
Figure 2:
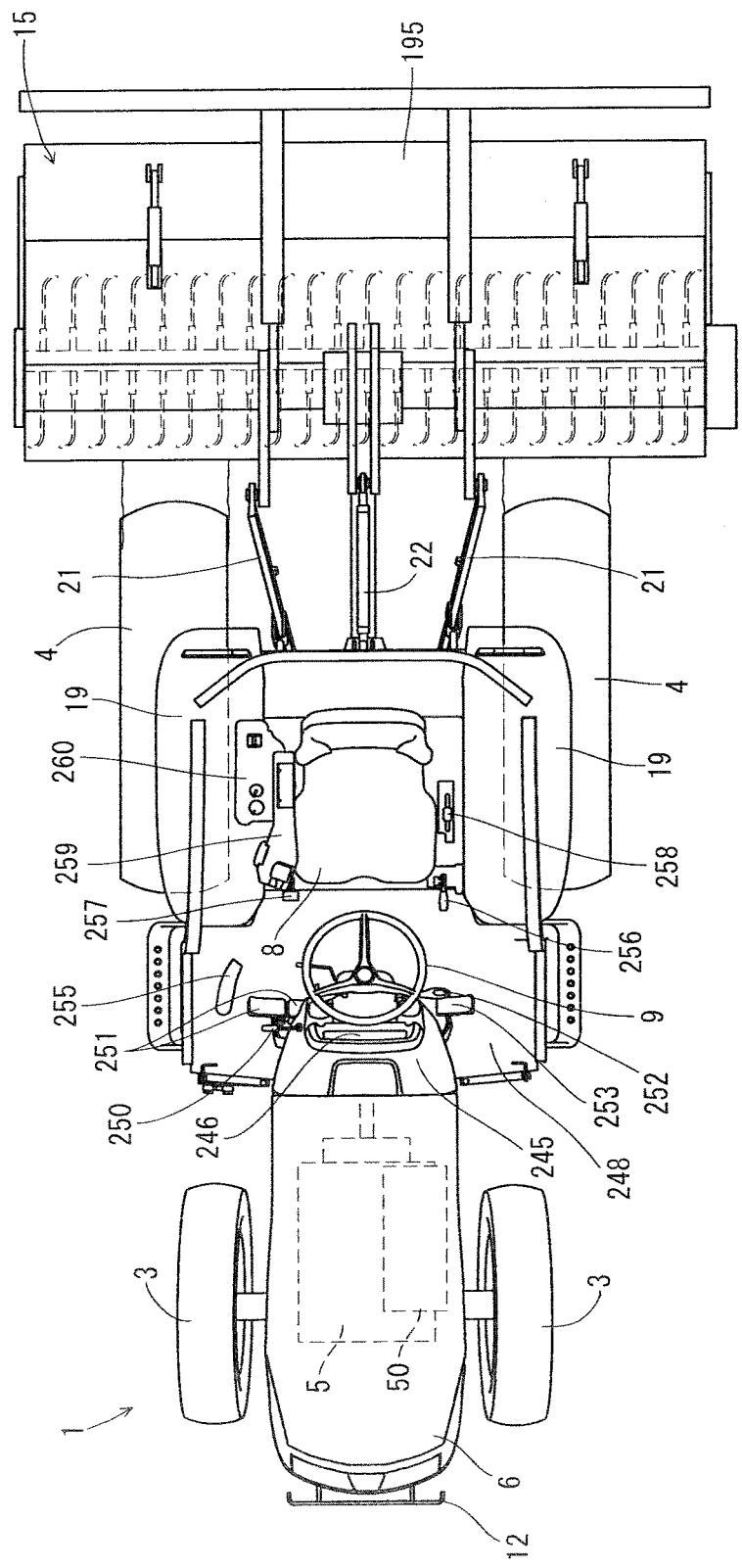
FIG. 2 is a plan view of the tractor.
Figure 3:
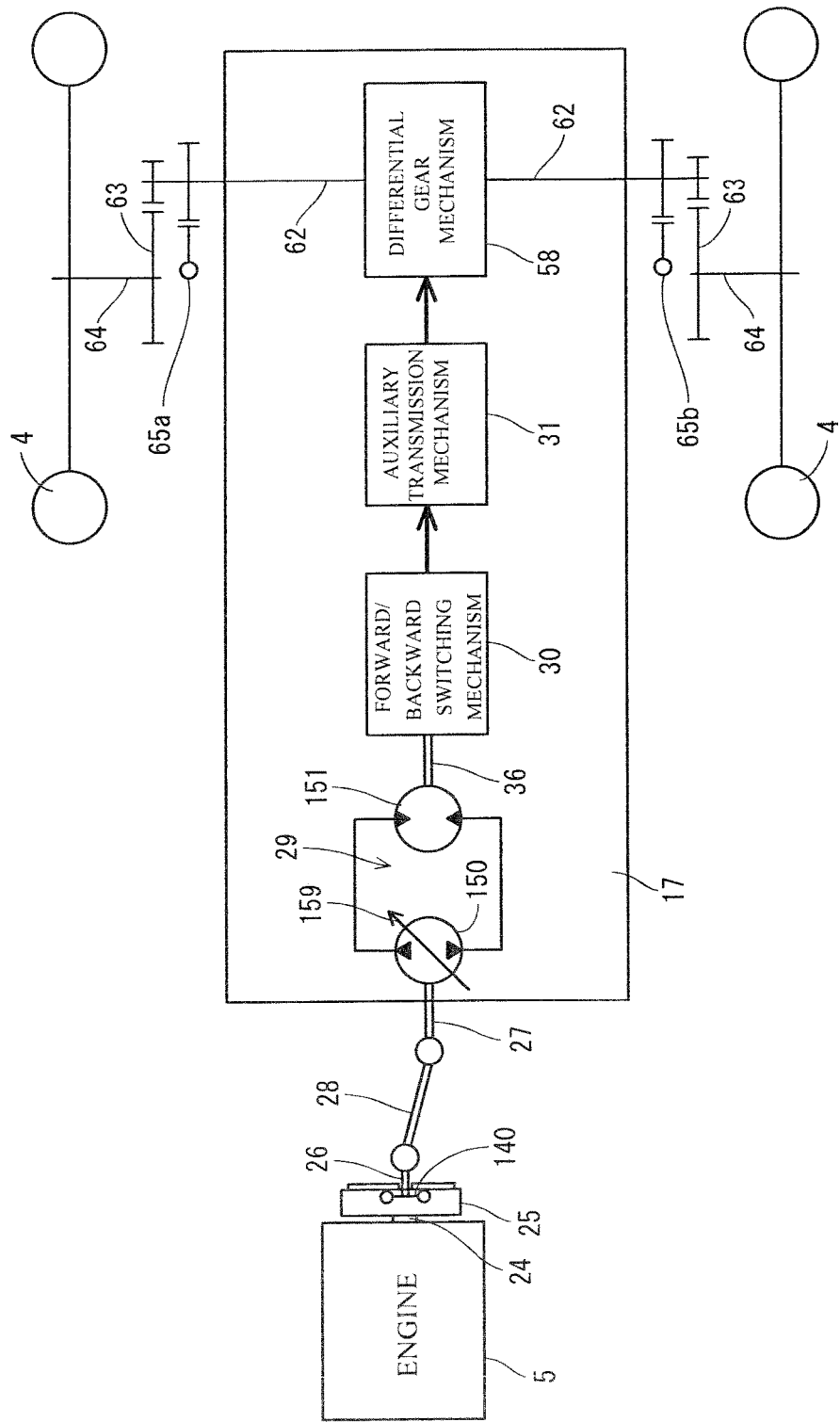
FIG. 3 is a block diagram showing an outline of a power transmission system.
Figure 4:
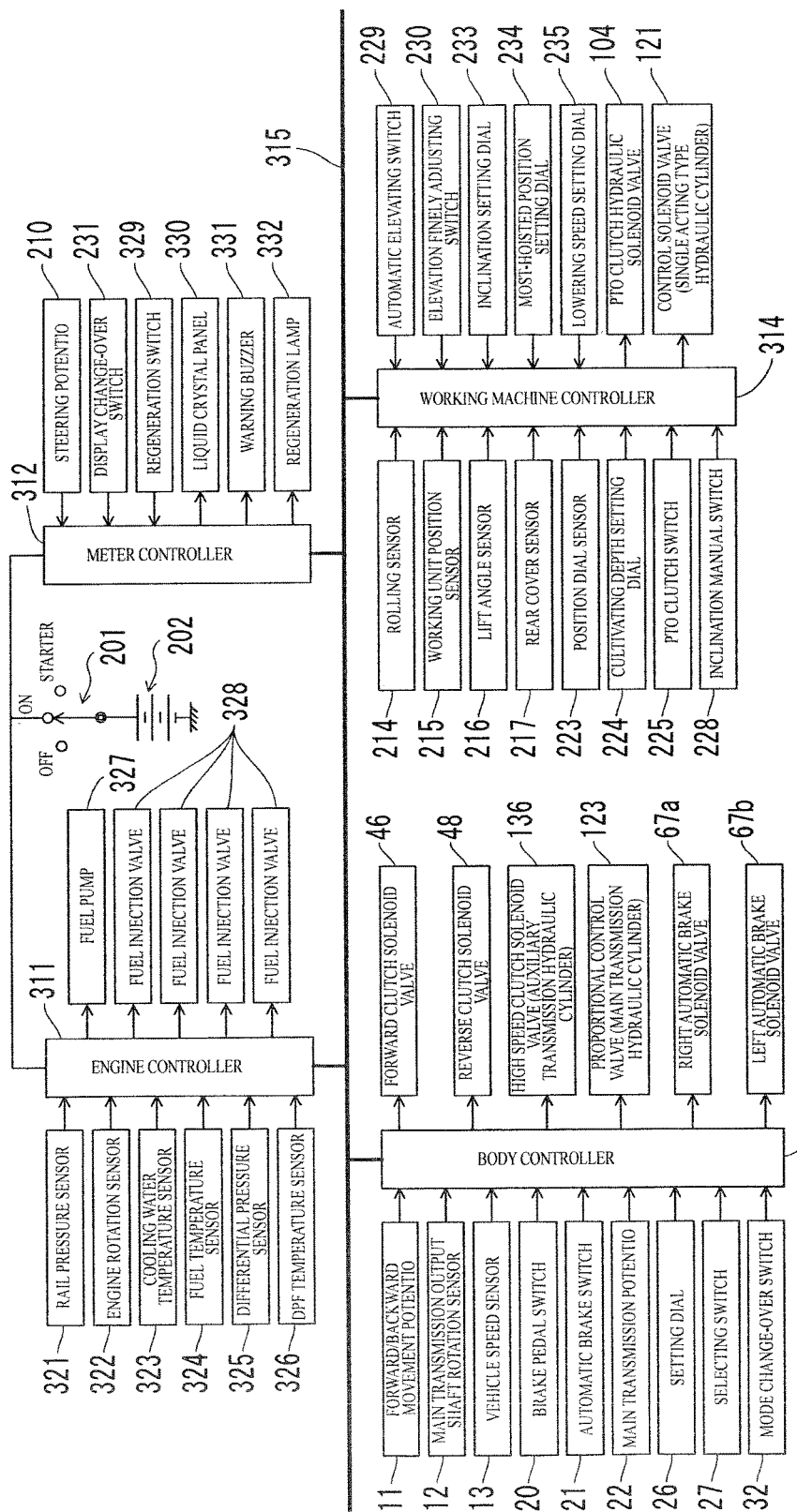
FIG. 4 is a function block diagram of a controller.
Figure 5:
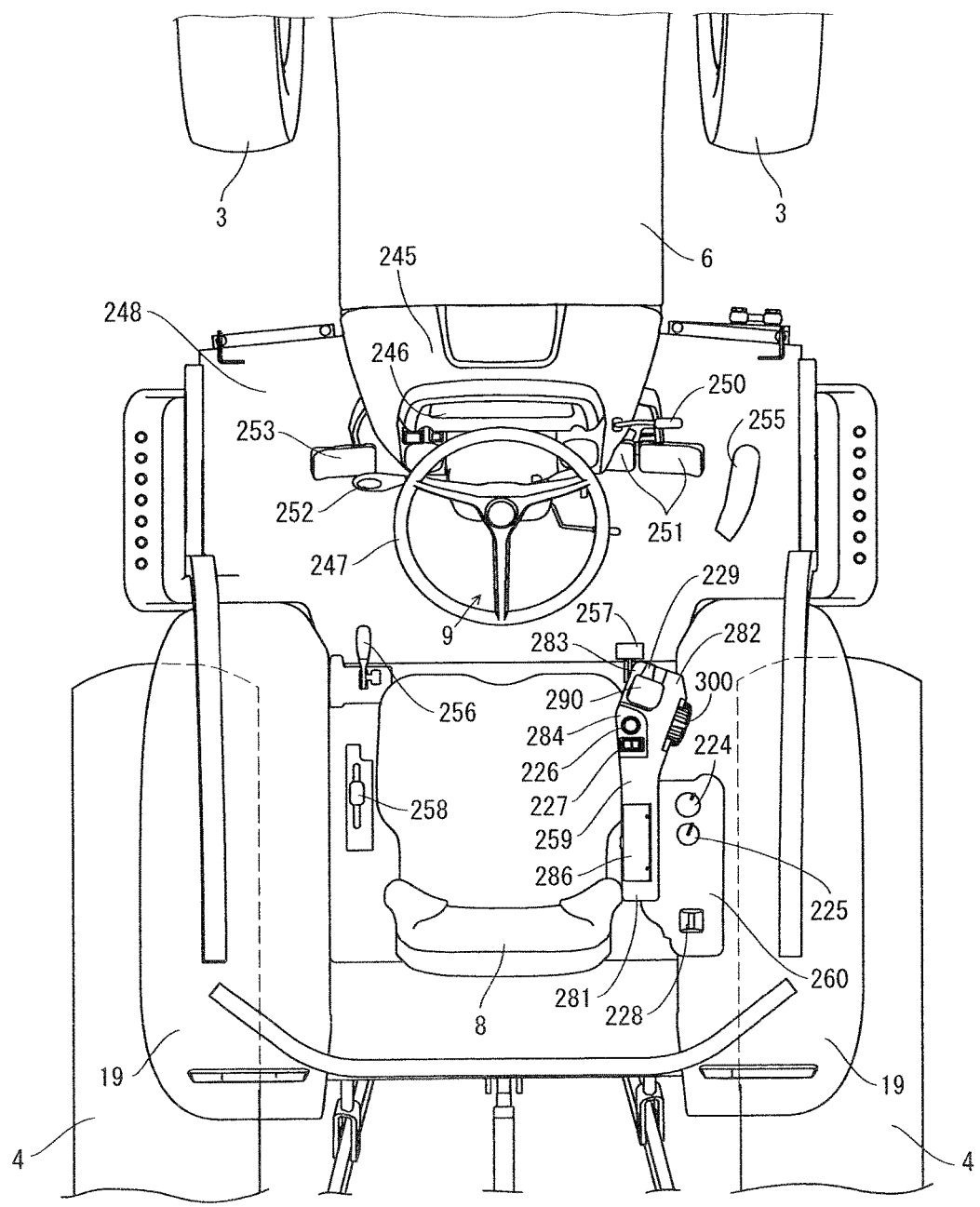
FIG. 5 is a plan view of a cabin.
Figure 6:
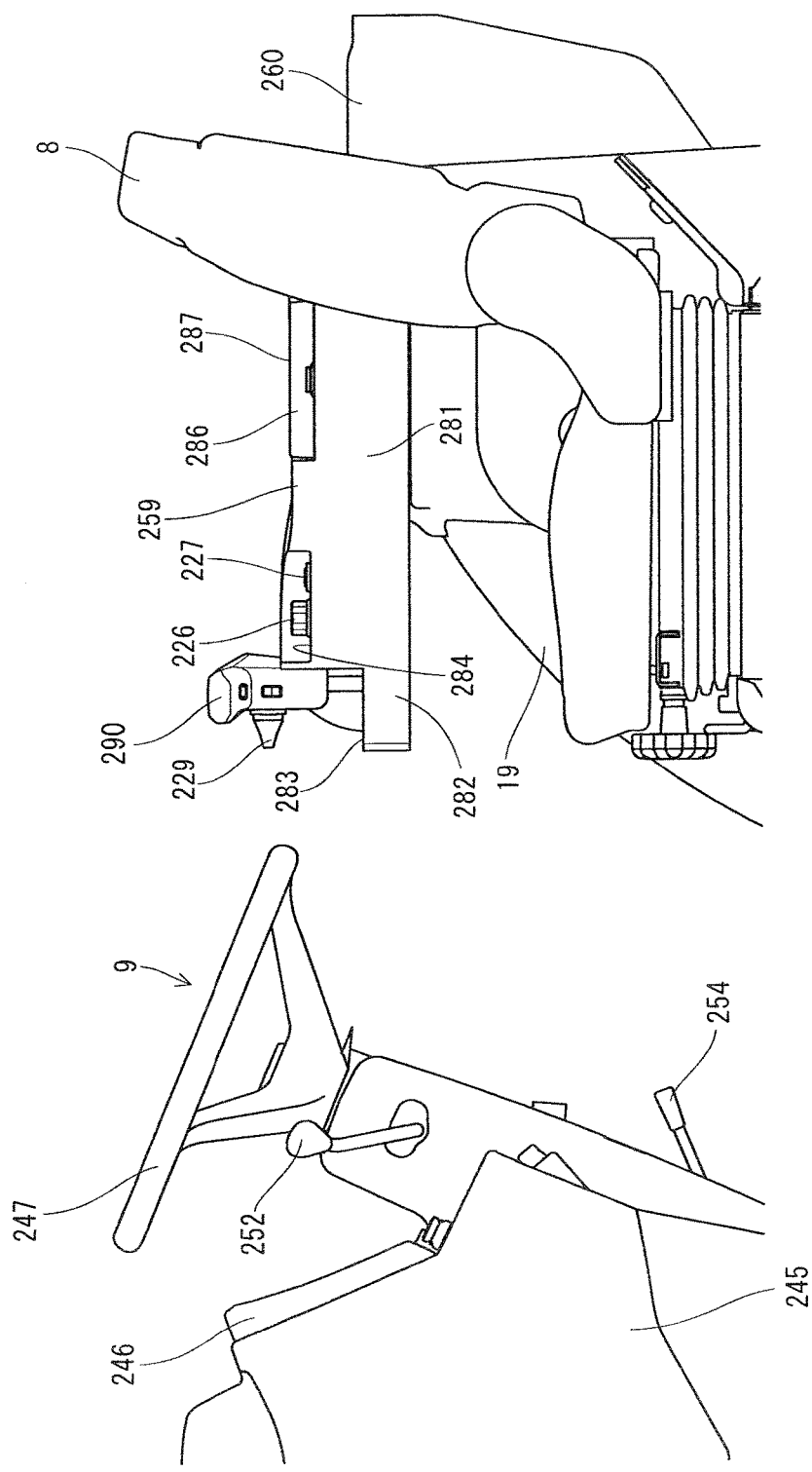
FIG. 6 is a left side view of the cabin.
Figure 7:
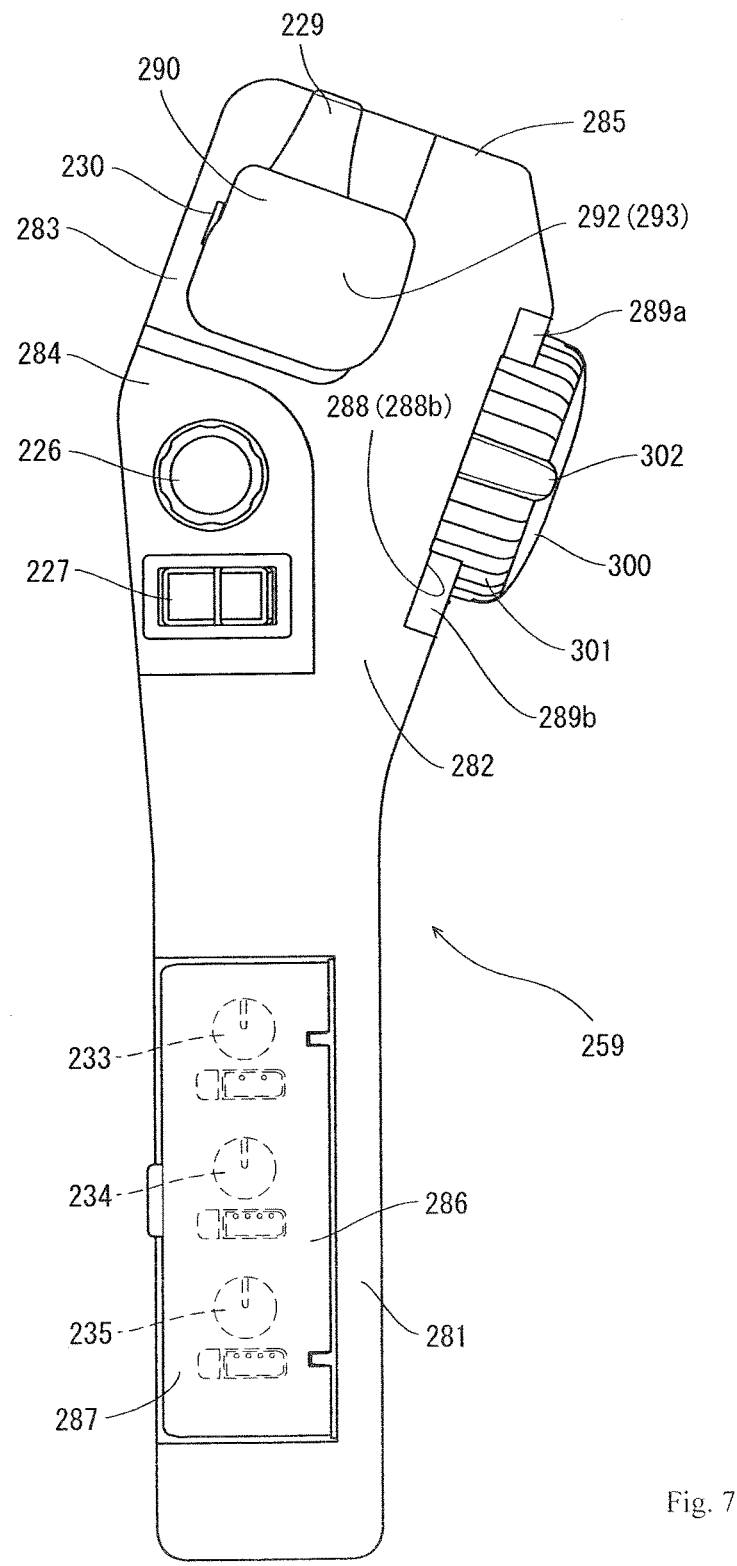
FIG. 7 is a plan view of an arm rest in a first embodiment.
Figure 8:
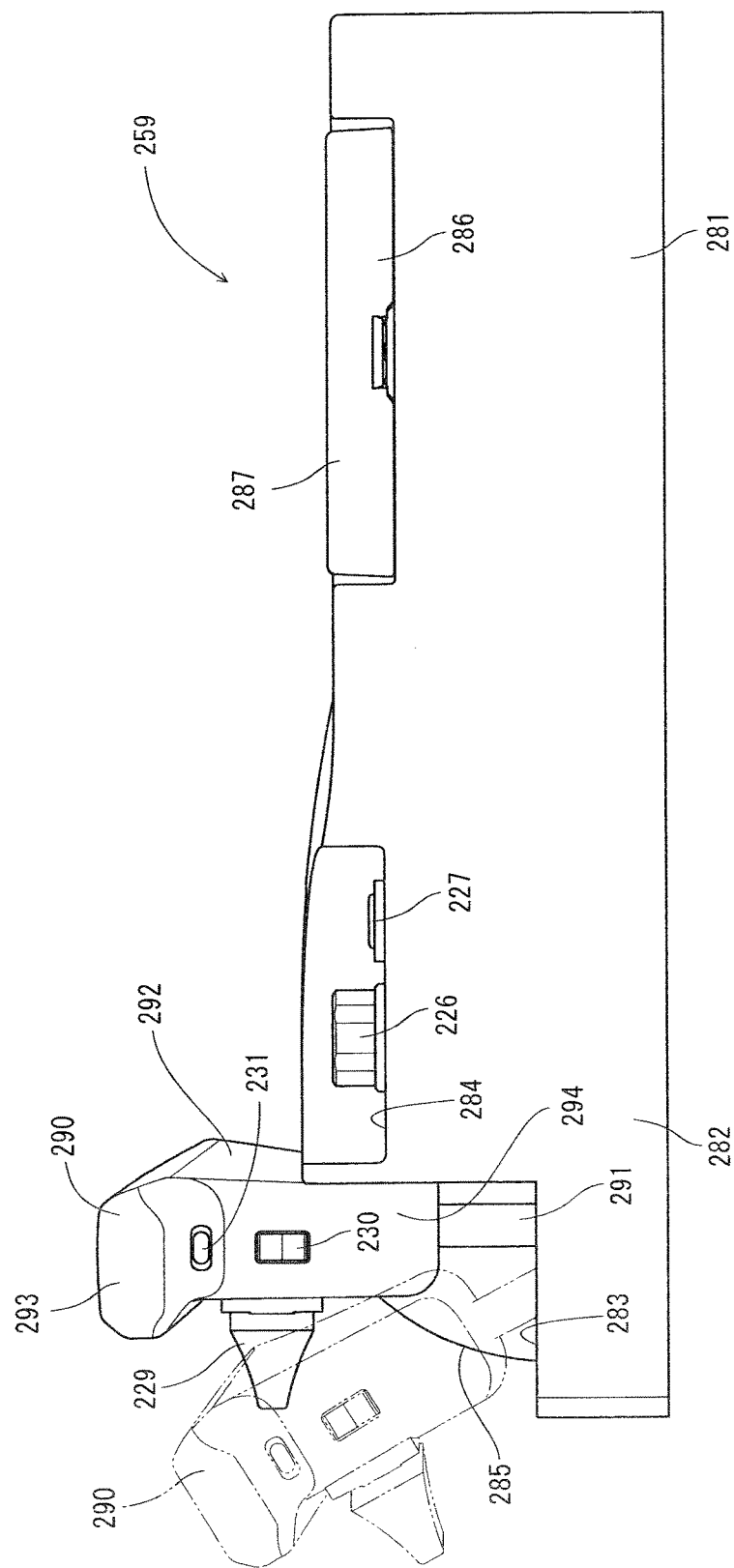
FIG. 8 is a left side view of the arm rest in the first embodiment.
Figure 9:
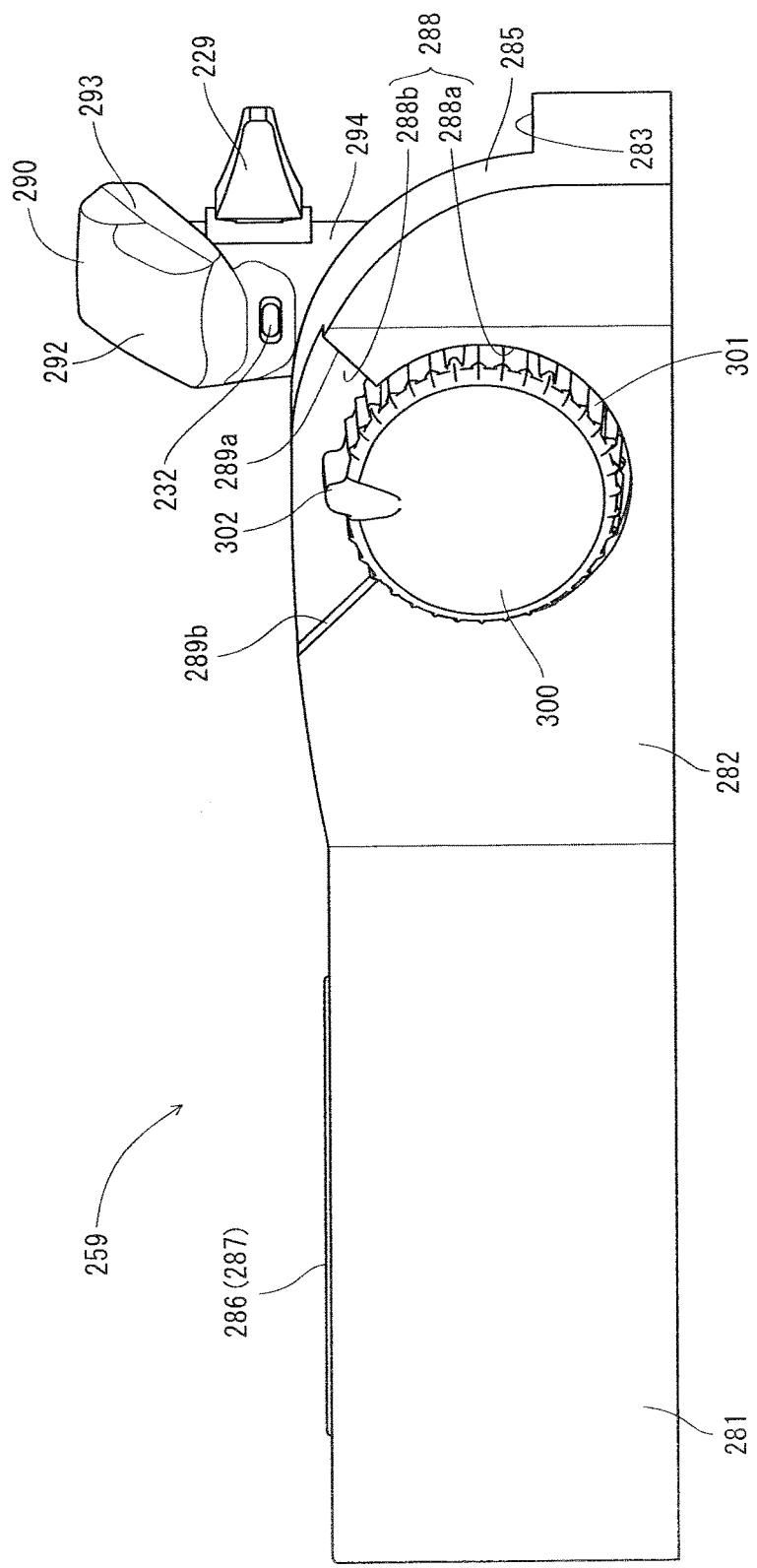
FIG. 9 is a right side view of the arm rest in the first embodiment.
Figure 10:
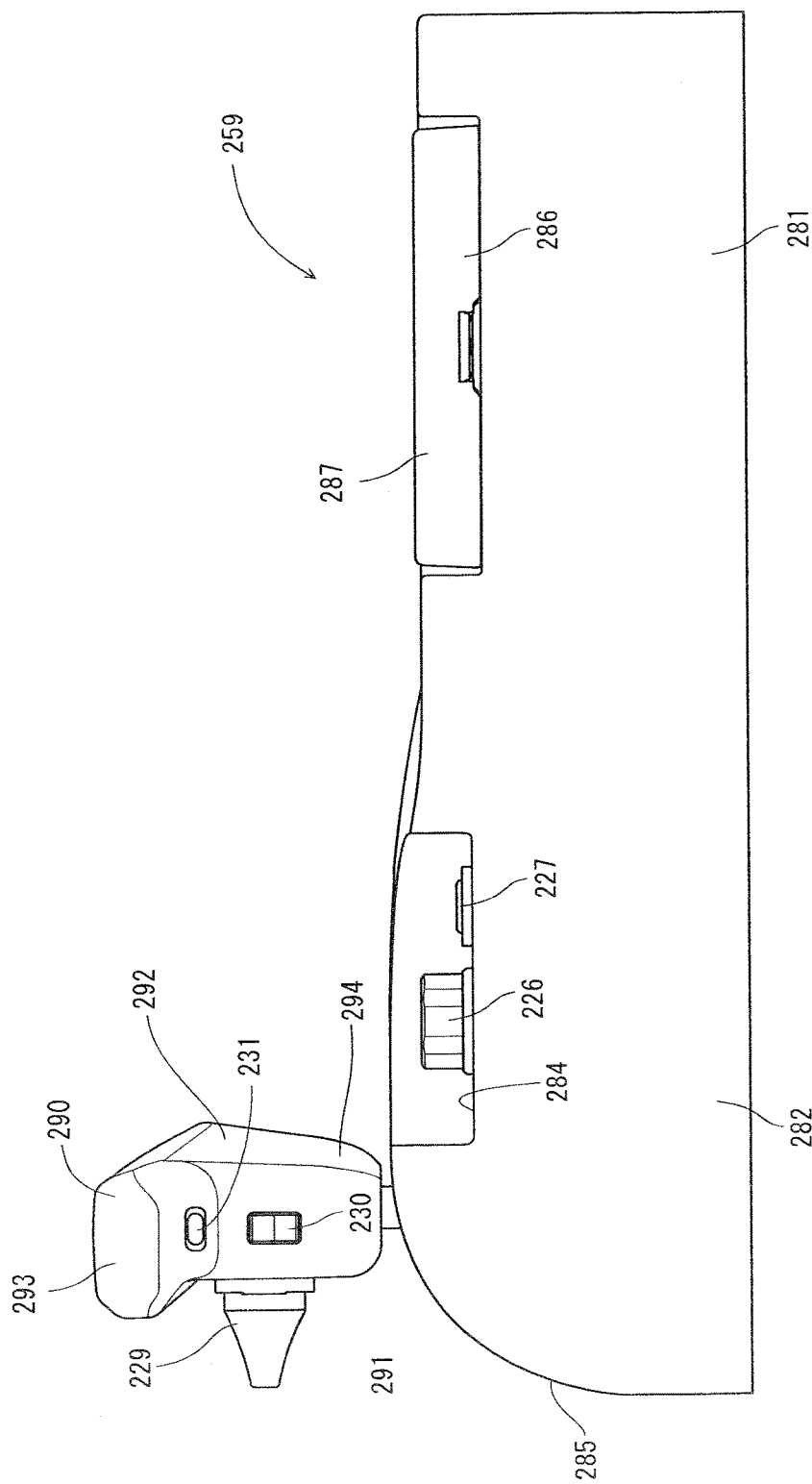
FIG. 10 is a left side view of an arm rest of another example.

Embodiments in which the invention of the present application is applied to a tractor as a working vehicle will be described based on the drawings (FIGS. 1 to 13). FIG. 1 is a left side view of the tractor, FIG. 2 is a plan view of the tractor, FIG. 3 is a block diagram showing an outline of a power transmission system, FIG. 4 is a function block diagram of a controller, FIG. 5 is a plan view of a cabin, FIG. 6 is a left side view of the cabin, FIG. 7 is a plan view of an arm rest, FIG. 8 is a left side view of the arm rest, and FIG. 9 is a right side view of the arm rest. Illustration of the cabin is omitted from FIG. 2 for convenience sake.

First, the outline of the tractor will be described with reference to FIGS. 1 and 2. A traveling machine body 2 of the tractor 1 of the embodiment is supported by a pair of right and left front wheels 3 and a pair of right and left rear wheels 4 as traveling units. The tractor 1 runs forward and rearward by driving the rear wheels 4 and the front wheels 3 by a common-rail type diesel engine 5 (engine, hereinafter) as a power source provided in a front portion of the traveling machine body 2. The engine 5 is covered with a hood 6. A cabin 7 is arranged on an upper surface of the traveling machine body 2, and a cockpit 8 and a steering handle (circular handle) 9 are arranged in the cabin 7. By steering the steering handle 9, a steering direction of the front wheels 3 is moved rightward and leftward. A fuel tank 11 for supplying fuel to the engine 5 is provided at a location lower than a bottom of the cabin 7.

In an engine room covered with the hood 6, an exhaust side of the engine 5 is connected to a continuously regenerative exhaust gas purification device 50 (diesel particulate filter). The exhaust gas purification device 50 includes a diesel oxidation catalyst such as platinum which produces nitrogen dioxide (NO2), and a soot filter of honeycomb structure which continuously oxidizes and removes collected particulate material (PM, hereinafter) at relatively low temperature. That is, the exhaust gas purification device 50 has such a configuration that diesel oxidation catalyst and the soot filter are arranged in a cylindrical purification casing in series in a moving direction of exhaust gas, and the exhaust gas purification device 50 removes PM in exhaust gas of the engine 5, and reduces carbon monoxide (CO) and hydrocarbon (HC) in exhaust gas.

The traveling machine body 2 is composed of an engine frame 14 having a front bumper 12 and a front axle case 13, and right and left machine body frames 16 detachably fixed to a rear portion of the engine frame 14 with bolts. Rear portions of the machine body frames 16 are provided with a transmission case 17 for appropriately speed-changing rotation power and transmitting the rotation power to the front and rear four wheels 3, 3, 4 and 4. The rear wheels 4 are mounted on the transmission case 17 through a rear axle case 18 which is mounted such that it projects outward from an outer surface of the transmission case 17. Upper portions of the right and left rear wheels 4 are covered with fenders 19 which are fixed to the machine body frames 16.

A hydraulic elevating mechanism 20 which hoists and lowers a rotary cultivator 15 as a working unit is detachably mounted on an upper surface a rear portion of the transmission case 17. The rotary cultivator 15 is connected to a rear portion of the transmission case 17 through a three-link mechanism which is composed of a pair of right and left lower links 21 and a top link 22. A PTO shaft 23 for transmitting a PTO driving force to the rotary cultivator 15 projects rearward from a rear surface of the transmission case 17.

As shown in FIG. 3, a flywheel 25 is mounted on an engine output shaft 24 such that the flywheel 25 is directly coupled to the engine output shaft 24. The engine output shaft 24 projects rearward from a rear surface of the engine 5. A main power shaft 26 which is connected to the flywheel 25 through a main clutch 140 and which extends rearward is connected to a main transmission input shaft 27 which projects forward from the transmission case 17 through a stretching-type power transmission shaft 28. Both ends of the power transmission shaft 28 include universal shaft joints. As shown in FIG. 1, a front wheel transmission shaft (not shown) which projects rearward from the front axle case 13 and a front wheel output shaft (not shown) which projects forward from a front surface of the transmission case 17 are connected to each other through a front wheel driving shaft 85.

A hydraulic continuously variable transmission 29, a forward/backward switching mechanism 30, a traveling auxiliary transmission gear mechanism 31 and a differential gear mechanism 58 are arranged in the transmission case 17.

Rotation power of the engine 5 is transmitted to the main transmission input shaft 27 of the transmission case 17 through the power transmission shaft 28, and is appropriately speed-changed by the hydraulic continuously variable transmission 29 and a traveling auxiliary transmission gear mechanism 30. This speed-changed power is transmitted to the right and left rear wheels 4 through the differential gear mechanism 58. The speed-changed power is transmitted to the front axle case 13 through the front wheel driving shaft 85 and is transmitted also to the right and left front wheels 3.

The hydraulic continuously variable transmission 29 is of an inline type in which the main transmission output shaft 36 is concentrically arranged with respect to the main transmission input shaft 27, and includes a variable capacity hydraulic pump unit 150 and a constant capacity transmission hydraulic motor 151 which is operated with high pressure hydraulic oil discharged from the hydraulic pump unit 150. The hydraulic pump unit 150 is provided with a pump awash plate 159 which can change its inclination angle with respect to an axis of the main transmission input shaft 27 to adjust a supply amount of the hydraulic oil. A main transmission hydraulic cylinder which changes and adjusts the inclination angle of the pump swash plate 159 with respect to the axis of the main transmission input shaft 27 is associated with the pump swash plate 159. By changing the inclination angle of the pump awash plate 159 by driving the main transmission hydraulic cylinder (not shown), an amount of hydraulic oil supplied from the hydraulic pump unit 150 to the hydraulic motor 151 is changed and adjusted, and a main transmission operation of the hydraulic continuously variable transmission 29 is carried out.

That is, if a switching valve (not shown) is operated with hydraulic oil from a proportional control valve 123 (see FIG. 4) which operates in proportion to an operation amount of a main transmission lever 290 (details thereof will be described later), the main transmission hydraulic cylinder (not shown) is driven, and then the inclination angle of the pump swash plate 159 with respect to the axis of the main transmission input shaft 27 is changed. The angle of the pump swash plate 159 of this embodiment is set such that the angle can be adjusted in a range between one of (positive) maximum inclination angles and the other (negative) maximum inclination angle both sandwiching a neutral angle of a substantially zero inclination (including zero or in the vicinity of zero), and the pump swash plate 159 is inclined to one of the maximum inclination angles (negative angle in this case, and the inclination angle is close to the maximum angle) when vehicle speed of the traveling machine body 2 is minimum.

When the inclination angle of the pump swash plate 159 is substantially zero (neutral angle), the hydraulic motor 151 is not driven by the hydraulic pump unit 150, and a main transmission output shaft 237 rotates substantially at the same rotation speed as the main transmission input shaft 27. When the pump swash plate 159 is inclined toward one direction (positive inclination angle) with respect to the axis of the main transmission input shaft 27, the hydraulic pump unit 150 accelerates and operates the hydraulic motor 151, and the main transmission output shaft 36 rotates at speed higher than that of the main transmission input shaft 27. As a result, rotation speed of the hydraulic motor 151 is added to rotation speed of the main transmission input shaft 27, and the rotation speed is transmitted to the main transmission output shaft 36. Hence, speed-changed power (vehicle speed) from the main transmission output shaft 36 is changed in proportion to the inclination angle (positive inclination angle) in a range of rotation speed higher than that of the main transmission input shaft 27. When the inclination angle of the pump swash plate 159 is positive and in the vicinity of the maximum angle, the vehicle speed of the traveling machine body 2 becomes the highest.

When the pump swash plate 159 is inclined in the other direction (negative inclination angle) with respect to the axis of the main transmission input shaft 27, the hydraulic pump unit 150 decelerates speed and operates (reversely rotates) the hydraulic motor 151, and the main transmission output shaft 36 rotates at rotation speed lower than that of the main transmission input shaft 27. As a result, the rotation speed of the hydraulic motor 151 is subtracted from the rotation speed of the main transmission input shaft 27, and the rotation speed is transmitted to the main transmission output shaft 36. Hence, speed-changed power from the main transmission output shaft 36 is changed in proportion to the inclination angle (negative inclination angle) of the pump swash plate 159 in a range of rotation speed lower than that of the main transmission input shaft 27. When the inclination angle of the pump swash plate 159 is negative and in the vicinity of the maximum angle, the vehicle speed of the traveling machine body 2 becomes minimum.

The forward/backward switching mechanism 30 receives rotation power from the main transmission output shaft 36 of the hydraulic continuously variable transmission 29. The forward/backward switching mechanism 30 includes a forward gear (not shown) and a reverse gear (not shown) for switching the forward/backward movements of the traveling machine body 2, and one of the forward gear and the reverse gear is selected and rotated by forward and reverse hydraulic clutches (not shown), thereby transmitting the power to an auxiliary transmission mechanism 31. At this time, in a neutral state where a forward/backward switching mechanism lever 252 is not inclined in any direction, both the forward and reverse hydraulic clutches (not shown) are brought into a power interruption state. Rotation power sent from the main transmission output shaft 36 toward the front and rear wheels 3 and 4 becomes substantially zero (the same state where main clutch 140 is OFF).

A forward clutch solenoid valve 46 (see FIG. 4) is driven by a forward inclining operation of the forward/backward switching mechanism lever 252 (see FIG. 2), and a forward clutch cylinder (not shown) is operated. Thus, rotation power caused by the main transmission output shaft 36 is transmitted to the auxiliary transmission mechanism 31 through the forward gear (not shown) in the forward/backward switching mechanism 30. A reverse clutch solenoid valve 48 (see FIG. 4) is driven by a reverse inclining operation of the forward/backward switching mechanism lever 252, and a reverse clutch cylinder (not shown) is operated. Thus, rotation power caused by the main transmission output shaft 36 is transmitted to the auxiliary transmission mechanism 31 through the reverse gear (not shown) in the forward/backward switching mechanism 30.

The auxiliary transmission mechanism 31 receives rotation power from the forward/backward switching mechanism 30, speed-changes and outputs rotation power which is sent through the forward/backward switching mechanism 30. The auxiliary transmission mechanism 31 includes an auxiliary transmission low speed gear (not shown) and an auxiliary transmission high speed gear (not shown), the auxiliary transmission mechanism 31 selects one of the low speed gear and the high speed gear and rotates the same by a low speed clutch (not shown) and a high speed clutch (not shown) and thus, the auxiliary transmission mechanism 31 changes speed of rotation power from the forward/backward switching mechanism 30, and transmits the rotation power to mechanisms of a rear stage.

By inclining an auxiliary transmission lever 258 (see FIG. 2) toward a low speed side, a position of a piston rod of an auxiliary transmission hydraulic cylinder (not shown) is displaced toward the low speed side in accordance with switching action of a high speed clutch solenoid valve 136 (see FIG. 4). Therefore, an auxiliary transmission shifter (not shown) which is connected to a tip end of the piston rod of the auxiliary transmission hydraulic cylinder (not shown) brings a low speed clutch (not shown) into a power connecting state, speed of rotation power from the forward/backward switching mechanism 30 is changed to low speed, and the rotation power is transmitted to the differential gear mechanism 58.

By inclining the auxiliary transmission lever 258 toward a high speed side, the position of the piston rod of the auxiliary transmission hydraulic cylinder (not shown) is displaced toward the high speed side in accordance with the switching action of the high speed clutch solenoid valve 136 (see FIG. 4). Therefore, the auxiliary transmission shifter (not shown) brings the high speed clutch (not shown) into the power connecting state, speed of the rotation power from the forward/backward switching mechanism 30 is changed to high speed, and the rotation power is transmitted to the differential gear mechanism 58.

The differential gear mechanism 58 receives rotation power from the auxiliary transmission mechanism 31, and transmits speed-changed power which is speed-changed by the auxiliary transmission mechanism 31 to the right and left rear wheels 4. At this time, the differential gear mechanism 58 transmits (differential action) the speed-changed power which is speed-changed by the auxiliary transmission mechanism 31 separately to differential output shafts 62 which extend in lateral directions by a differential gear (not shown). The differential output shafts 62 are connected to rear axles 64 through final gears 63 and the like, and the rear wheels 4 are mounted on tip ends of the rear axles 64. Brake operating mechanisms 65a and 65b are associated with the differential output shafts 62, and the brake operating mechanisms 65a and 65b carry out braking action by a depressing operation of brake pedals 251 (see FIG. 2) located on a right side of a steering column 245.

If a steering angle of the steering handle 9 (see FIGS. 1 and 2) becomes equal to or greater than a predetermined angle, an automatic brake solenoid valve 67a (67b) corresponding to inner one of the rear wheels 4 in terms of turning action is driven to operate a brake cylinder (not shown), and the brake operating mechanism 65a (65b) corresponding to the inner one of the rear wheels 4 in terms of turning action automatically carries out braking action. Hence, the tractor can turn in a small radius (U-turn). The differential gear mechanism 58 includes a differential locking mechanism (not shown) for stopping the differential action (driving right and left differential output shafts 62 always at equal speed). In this case, by engaging a lock pin provided such that the pin can come in and out with the differential gear by a depressing operation of a differential locking pedal 257 (see FIG. 2), the differential gear is fixed, a differential function stops, and the right and left differential output shafts 62 are rotated and driven at equal speed.

The transmission case 17 of the above-described configuration is provided therein with a PTO transmission gear mechanism (not shown) for switching driving speed of the PTO shaft 23, and a PTO clutch (not shown) which can transmit power and shut off the transmission of power between the main transmission input shaft 27 and the PTO transmission gear mechanism. By the action of the PTO transmission gear mechanism and the PTO clutch, power from the engine 5 is transmitted to the PTO shaft 23.

In this case, if a later-described PTO clutch switch 225 is turned ON, a PTO clutch hydraulic solenoid valve 104 (see FIG. 4) is driven, and the PTO clutch is brought into a power connected state. As a result, rotation power from the engine 5 transmitted through the main transmission input shaft 27 is output from a PTO gear mechanism (not shown) toward the PTO shaft 23. At this time, if a speed-changing operation is carried out for the PTO transmission lever 256, speed-changing output of the PTOs of first speed to fourth speed and reverse is transmitted to the PTO shaft 23 by selecting one of the plurality of gears in the PTO transmission gear mechanism (not shown) and rotating the gear.

Next, a configuration for executing the various control operations (speed-changing control, automatic horizontal control, cultivate-depth automatic control) will be described with reference to FIG. 4. As shown in FIG. 4, the tractor 1 includes an engine controller 311 which controls a driving operation of the engine 5, a meter controller 312 which controls display action of a meter panel 246 provided on a steering column (steering column) 245, a body controller 313 which controls speed of the traveling machine body 2, and a working machine controller 314 which controls a state of the rotary cultivator 15.

Each of the controllers 311 to 314 includes a CPU which executes various computation processing and control, a ROM for storing a control program and data, a RAM for temporarily storing a control program and data, a timer for measuring time, and an I/O interface. The controllers 311 to 314 are connected to each other through a CAN communication bus 315 such that the controllers can communicate with each other. The engine controller 311 and the meter controller 312 are connected to a battery 202 through a power supply application key switch 201. The key switch 201 is a rotary switch which can be rotated and operated by a predetermined key inserted into a key hole, and the key switch 201 is mounted on the steering column 245 located in front of the cockpit 8.

Connected to an input side of the engine controller 311 are a rail pressure sensor 321 which detects pressure of fuel in a common-rail of the engine 5, an engine rotation sensor 322 which detects rotation speed (cam shaft position of crankshaft) of the engine 5, a cooling water temperature sensor 323 which detects temperature of cooling water of the engine 5, a fuel temperature sensor 324 which detects temperature of fuel in the common-rail of the engine 5, a differential pressure sensor 325 which detects differential pressure of exhaust gas before and after (upstream and downstream) of the soot filter in the exhaust gas purification device 50, and a DPF temperature sensor 326 which detects temperature of exhaust gas in the exhaust gas purification device 50.

With this configuration, the engine controller 311 controls a fuel pump 327 and fuel injection valves 328 of the engine 5. That is, fuel in a fuel tank (not shown) is sent to the common-rail (not shown) by the fuel pump 327 under pressure, and the fuel is accumulated in the common-rail as high pressure fuel. By (electronically) controlling an opening/closing state of the fuel injection valves 328, injection pressure, injection timing and injection period (injection amount) of high pressure fuel in the common-rail (not shown) are controlled, and the fuel is injected from the injector into the cylinders of the engine 5. Hence, it is possible to reduce nitrogen oxide (NOx) discharged from the engine 5, and to reduce noise and vibration of the engine 5.

Connected to an input side of the meter controller 312 are a steering potentio 210 which detects a turning amount (steering angle) of the steering handle 9, a display change-over switch 231 for switching between display states of a liquid crystal panel 330, and a regeneration switch 329 as an input member which permits regeneration action of the exhaust gas purification device 50. Connected to an output side of the meter controller 312 are the liquid crystal panel 330 in the meter panel 246, a warning buzzer 331 which sounds in association with regeneration action of the exhaust gas purification device 50, and a regeneration lamp 332 as a warning lamp which twinkles in association with regeneration action of the exhaust gas purification device 50.

Connected to an input side of the body controller 313 are a forward/backward movement potentio 211 which detects an operation position of the forward/backward switching mechanism lever 252, a main transmission output shaft rotation sensor 212 which detects the output rotation number of the main transmission output shaft 36, a vehicle speed sensor 213 which detects the rotation speeds (traveling auxiliary speeds) of the front and rear wheels 3 and 4, a brake pedal switch 220 which detects whether the brake pedals 251 are depressed, an automatic brake switch 221 for switching between the automatic brake solenoid valves 67a and 67b, a main transmission potentio 222 which detects an operation position of a main transmission lever 290, a rotation number/vehicle speed setting dial 226, a rotation number/vehicle speed selecting switch 227 and a mode change-over switch 232.

Connected to an output side of the body controller 313 are the forward clutch solenoid valve 46 for operating the forward clutch cylinder (not shown), the reverse clutch solenoid valve 48 for operating the reverse clutch cylinder (not shown), the high speed clutch solenoid valve 136 for operating the auxiliary transmission hydraulic cylinder (not shown), the proportional control valve 123 for operating the main transmission hydraulic cylinder (not shown) in proportion to an inclination operation amount of the main transmission lever 290, and the automatic brake solenoid valves 67a and 67b for respectively operating the left and right brake operating mechanisms 65a and 65b.

Connected to an input side of the working machine controller 314 are a pendulum type rolling sensor 214 which detects a lateral inclination angle of the traveling machine body 2, a potentio meter type working unit position sensor 215 which detects a lateral inclination angle of the rotary cultivator 15 relative to the traveling machine body 2, a potentio meter type lift angle sensor 216 which detects a turning angle of a lift arm (not shown) which connects the hydraulic elevating mechanism 20 and the right and left lower links 21 to each other, a potentio meter type rear cover sensor 217 which detects a vertically turning angle of a cultivating rear cover 195 (see FIGS. 1 and 2) which vertically turns when a cultivating depth of the rotary cultivator 15 is changed, a position dial sensor 223 which detects an operating position of a working unit position dial 300 which manually changes and adjusts a height position of the rotary cultivator 15, a cultivating depth setting dial 224, the PTO clutch switch 225, an inclination manual switch 228, an automatic elevating switch 229, an elevation finely adjusting switch 230, an inclination setting dial 233, a most-hoisted position setting dial 234 and a lowering speed setting dial 235.

Connected to an output side of the working machine controller 314 are the PTO clutch hydraulic solenoid valve 104 which operates the PTO clutch 100 (not shown), and a control solenoid valve 121 for supplying hydraulic oil to a single acting type hydraulic cylinder (not shown) of the hydraulic elevating mechanism 20.

The cockpit 8 and a structure around the cockpit 8 will be described with reference to FIGS. 5 and 6. The steering column 245 surrounding a rear side of the engine 5 is arranged in front of the cockpit 8 in the cabin 7. The steering handle 9 is substantially circular as viewed from above. The steering handle 9 is mounted on an upper portion of a handle shaft which projects from an upper surface of the steering column 245. Therefore, a substantially ring-shaped steering wheel 247 in the steering handle 9 inclines diagonally rearward and downward with respect to a horizontal direction.

A throttle lever 250 for setting the output rotation number of the engine 5, and the pair of right and left brake pedals 251 for braking the traveling machine body 2 are arranged on a right side of the steering column 245. The forward/backward switching mechanism lever 252 for switching a moving direction of the traveling machine body 2 between forward movement and rearward movement, and a clutch pedal 253 for turning off the main clutch 140 which transmits power and shuts off the transmission of power are arranged on a left side of the steering column 245. A parking brake lever 254 for keeping the right and left brake pedals 251 at depressed positions is arranged on a back surface side of the steering column 245.

An accelerator pedal 255 is arranged on a floor place 248 in the cabin 7 on a right side of the steering column 245. The engine rotation number which is set by the throttle lever 250 is defined as a minimum rotation number, and the accelerator pedal 255 accelerates and decelerates the engine rotation number within a range equal to or higher than the minimum rotation number. The PTO transmission lever 256 for switching the driving speed of the later-described PTO shaft 23, and the differential locking pedal 257 for rotating and driving the right and left rear wheels 4 at equal speed are arranged below the cockpit 8. The auxiliary transmission lever 258 for switching an output range of the traveling auxiliary transmission gear mechanism 30 (see FIG. 3) between low speed and high speed is arranged on a left side of the cockpit 8.

An arm rest 259 on which an arm or an elbow of an operator sitting on the cockpit 8 is put is provided on a right side of the cockpit 8. The arm rest 259 is a separate member from the cockpit 8. The arm rest 259 includes a main transmission lever 290 which is the traveling system operating means, and the working unit position dial (elevating dial) 300 which is the working system operating means. The main transmission lever 290 can incline forward and rearward as a main transmission operating body. In this embodiment, when the main transmission lever 290 is operated to incline forward, vehicle speed of the traveling machine body 2 is increased, and when the main transmission lever 290 is operated to incline rearward, the vehicle speed of the traveling machine body 2 is reduced. The working unit position dial 300 is of a dial type for manually changing and adjusting a height position of the rotary cultivator 15.

A rear portion of a lower end of the arm rest 259 is pivotally attached to a bracket (not shown) which stands on a seat frame (not shown) on which the cockpit 8 is arranged for example such that the arm rest 259 can vertically turn and flip up with respect to the bracket. The arm rest 259 is configured such that its turning attitude caused by the vertical turning motion can be adjusted in a plurality of stages (four stages in this embodiment). It is also possible to employ such a configuration that the arm rest 259 is independent from longitudinal sliding motion of the cockpit 8, and the position of the arm rest 259 can be adjusted (longitudinally slidable) along the moving direction (longitudinal direction) of the traveling machine body 2.

If the above-described vertically turnable configuration is employed, it is possible to adjust a turning attitude of the arm rest 259 in stages in accordance with a physical size and a working attitude of an operator sitting on the cockpit 8. Therefore, it is possible to set the arm rest 259 such that it can reliably support an arm of the operator and the arm rest does not touch an elbow of the operator. Further, when the arm rest 259 is configured such that its longitudinally sliding position can be adjusted, it is effective to reduce fatigue of the operator caused by long time working in cooperation with the longitudinal sliding position adjusting function of the cockpit 8 and the vertically turnable configuration of the arm rest 259.

An operation stage 260 provided with various kinds of operating means is fixed to a right side of the arm rest 259 above the fenders 19. The cultivating depth setting dial 224, the PTO clutch switch 225 and the inclination manual switch 228 are arranged on an upper surface of the operation stage 260. The cultivating depth setting dial 224 is of a dial type for presetting a target cultivating depth of the rotary cultivator 15. The PTO clutch switch 225 is for turning the PTO clutch 100 ON and OFF to transmit power from the PTO shaft 23 to the rotary cultivator 15 and to shut off the transmission of power. The inclination manual switch 228 is for manually changing and adjusting a lateral inclination angle of the rotary cultivator 15.

The PTO clutch switch 225 is a push switch in which if the PTO clutch switch 225 is rotated in a clockwise direction as viewed from above while once pressing down the switch, the PTO clutch switch 225 is locked at the pushed down position, the power transmission from the PTO shaft 23 to the rotary cultivator 15 is brought into a connection state, and if the PTO clutch switch 225 is again pressed down, the switch returns to its original position, and the power transmission from the PTO shaft 23 to the rotary cultivator 15 is brought into a shut-off state. The inclination manual switch 228 is a self-reset type (momentary type) lever switch which is inclined in the lateral direction and only when the inclination manual switch 228 is operated, the lateral inclination angle of the rotary cultivator 15 is changed.

A detailed structure of the arm rest 259 according to a first embodiment will be described with reference to FIGS. 7 to 9. The arm rest 259 includes a base (arm rest rear portion) 281 which extends long in the longitudinal direction, and an extending portion (arm rest front portion) 282 which extends forward from the base 281. The extending portion 282 is arranged such that it bends in a direction (right direction in this embodiment) separating away from the cockpit 8 with respect to the base 281 which extends in parallel to the cockpit 8, and the arm rest 259 is formed into a substantially L-shape as a whole as viewed from above.

As shown in FIGS. 7 and 8, the arm rest 259 includes a front notch 283 in a front end of the extending portion 282 on the side of the cockpit 8. The front notch 283 is recessed downward from an upper surface of the extending portion 282. The main transmission lever 290 projects from an upper surface of the front notch 283. The extending portion 282 includes a step portion 284 on the side of the cockpit 8 behind the front notch 283 (on connection side with base 281). The step portion 284 recesses downward from the upper surface of the extending portion 282. The later-described rotation number/vehicle speed setting dial (setting dial) 226 and the later-described rotation number/vehicle speed selecting switch (selecting switch) 227 are arranged on an upper surface of the step portion 284.

The height position of an upper surface of the step portion 284 is higher than the upper surface of the front notch 283 and lower than an upper surface of the base 281. Thus, even if an operator puts the arm or elbow on the base 281 of the arm rest 259 and operates the main transmission lever 290 in front of the extending portion 282, it is possible to reduce fear that the arm or elbow unintentionally touches the setting dial 226 and the selecting switch 227 of the step portion 284. Therefore, it is possible to remarkably reduce or prevent a wrong operation of the setting dial 226 and the selecting switch 227.

The rotation number/vehicle speed setting dial 226 is for presetting maximum rotation speed of the engine 5 or maximum travelling speed of the traveling machine body 2. The rotation number/vehicle speed selecting switch 227 is for designating whether a value which is set by the rotation number/vehicle speed setting dial 226 is the maximum rotation speed of the engine 5 or the maximum traveling speed of the traveling machine body 2. The rotation number/vehicle speed selecting switch 227 is composed of a position-keeping type (alternate type) switch (position-keeping type rocker switch in example of this embodiment). Thus, if the rotation number/vehicle speed selecting switch 227 designates the rotation speed, the rotation number/vehicle speed setting dial 226 sets the maximum rotation speed of the engine 5. If the rotation number/vehicle speed selecting switch 227 designates the traveling speed, the rotation number/vehicle speed setting dial 226 sets the maximum traveling speed of the traveling machine body 2.

As shown in FIGS. 7 and 8, a switch box 286 is embedded in the base 281 of the arm rest 259 on the side of the back cockpit 8. An upper surface of the switch box 286 includes an upper surface lid 287 which opens toward a direction opposite from the cockpit 8. That is, the upper surface lid 287 is pivotally supported by a side edge which is on the opposite side from the cockpit 8 such that an axial direction of a rotation shaft of the upper surface lid 287 becomes equal to a longitudinal direction of the base 281. Therefore, when the upper surface lid 287 opens, since the inner side of the switch box 286 is opened from the side of the cockpit 8, an operator sitting on the cockpit 8 can easily operate. Normally, the upper surface lid 287 is closed, an upper surface of the upper surface lid 287 is located at the same height position as the upper surface of the base 281 of the arm rest 259, and the operator puts the arm or elbow on the upper surface lid 287.

The switch box 286 is arranged such that its longitudinal direction extends along a longitudinal direction of the base 281. An inner upper surface of the switch box 286 which is opposed to a lower surface of the upper surface lid 287 includes the inclination setting dial 233, the most-hoisted position setting dial 234 and the lowering speed setting dial 235. That is, when the upper surface lid 287 opens, the setting dials 233 to 235 are arranged on a line on the inner upper surface of the switch box 286. The inclination setting dial 233 is for presetting a target lateral inclination angle of the rotary cultivator 15 relative to the traveling machine body 2. The most-hoisted position setting dial 234 is for setting a most-hoisted position of the rotary cultivator 15. The lowering speed setting dial 235 is for setting speed when the rotary cultivator 15 is lowered for reducing the impact when the rotary cultivator 15 is lowered.

As shown in FIG. 8, the main transmission lever 290 includes a lever shaft 291, and a grip 292 (holding part)

grasped by an operator is mounted on an upper end of the lever shaft 291. A lower end of the lever shaft 291 is pivotally supported in the extending portion 282 which becomes a lower side of the front notch 283. Thus, the main transmission lever 290 can incline forward and rearward. That is, the main transmission lever 290 can incline forward and rearward from a substantially vertical attitude to a forward attitude. As shown in FIGS. 8 and 9, a front end surface of the extending portion 282 except the front notch 283 is composed of a forward curved surface 285 which is a substantially ¼ circular curved surface extending along a turning locus of the main transmission lever 290. Therefore, the grip 292 projects from the forward curved surface 285 of the extending portion 282 irrespective of an inclination attitude of the main transmission lever 290. With this configuration, since the operator's hand grasping the grip 292 does not touch the extending portion 282 of the arm rest 259, the operator can smoothly operate the main transmission lever 290.

When the main transmission lever 290 is inclined forward (toward steering handle 9), the main transmission potentio 222 inclines the pump awash plate 159 (see FIG. 3) toward a positive inclination angle side in accordance with an operation position of the main transmission lever 290, and the main transmission potentio 222 accelerates the traveling speed of the traveling machine body 2. When the main transmission lever 290 is inclined rearward (toward cockpit 8), the main transmission potentio 222 inclines the pump swash plate 159 (see FIG. 3) toward a negative inclination angle side in accordance with the operation position of the main transmission lever 290, and the main transmission potentio 222 decelerates the traveling speed of the traveling machine body 2.

The operator can operate the main transmission lever 290 in a state where the arm is put on the upper surface lid 287 (on arm rest 259). Therefore, it is extremely easy to operate the main transmission lever 290, and it is possible to exert a high effect for enhancing the travelling operability in the tractor 1. At this time, a position of the step portion 284 is a position on which the operator's wrist is not superposed almost at all as viewed from above in a state where the operator's arm is placed on the upper surface lid 287 (on arm rest 259). Therefore, the arm on the arm rest 259 does not unintentionally touch (does not hinder) the setting dial 226 and the selecting switch 227, and a wrong operation of the setting dial 226 and the selecting switch 227 can be reduced.

As shown in FIGS. 7 to 9, the grip 292 of the main transmission lever 290 includes a grip portion 293, and an upper surface of the grip portion 293 is formed into a gently upward convex-curved surface. A portion of an upper surface of the grip portion 293 of the grip 292 on the side of the cockpit 8 is inclined such that the upper surface becomes an uppermost end so that the operator can easily grasp the grip portion 293 with a right hand. A lateral width of this grip portion 293 is narrowed toward a connection between the grip portion 293 and the lever shaft 291 (downward) as viewed from front. That is, the grip portion 293 is provided at its lower side with a narrow part. A lever connecting portion 294 which is to be connected to the lever shaft 291 is provided on a lower side of the grip portion 293 of the grip 292. A lateral width of the lever connecting portion 294 is equal to a lateral width of the lower side of the grip portion 293.

In the grip 292, the automatic elevating switch 229 is arranged on a front surface of the lever connecting portion 294, and the elevation finely adjusting switch 230 is arranged on a side surface (left side surface) of the lever connecting portion 294 on the side of the cockpit 8. In the grip portion 293 of the grip 292, the display change-over switch 231 is arranged on a narrow part surface on the side (left side) of the cockpit 8, and the mode change-over switch 232 is arranged on the narrow part surface on the opposite side (right side) of the cockpit 8. The automatic elevating switch 229 is for forcibly hoisting and lowering the rotary cultivator 15 to a predetermined height. The elevation finely adjusting switch 230 is for finely adjusting a height position of the rotary cultivator 15. The display change-over switch 231 is for switching between the display contents of the liquid crystal panel 330. The mode change-over switch 232 is for changing and adjusting the traveling speed when the tractor turns and travels rearward.

The automatic elevating switch 229 is a self-reset type (momentary type) lever switch which inclines in the vertical direction. When the automatic elevating switch 229 is inclined upward, the rotary cultivator 15 is hoisted to a most-hoisted position which is set by the most-hoisted position setting dial 234, and when the automatic elevating switch 229 is inclined downward, the rotary cultivator 15 is lowered to a position which is set by the working unit position dial 300. The elevation finely adjusting switch 230 is composed of a self-reset type (momentary type) rocker switch, and the rotary cultivator 15 is hoisted and lowered only while the elevation finely adjusting switch 230 is operated.

Since the main transmission lever 290 includes the automatic elevating switch 229, the elevation finely adjusting switch 230, the display change-over switch 231 and the mode change-over switch 232, the operator can easily perform control in accordance with a traveling situation only by operating the main transmission lever 290 with the right hand. That is, it is possible to adjust a height position of the rotary cultivator 15 by operating the automatic elevating switch 229 and the elevation finely adjusting switch 230 while carrying out the inclining operation of the main transmission lever 290. Even when the operator desires to switch between the display contents of the liquid crystal panel 330, the operator only needs to operate the display change-over switch 231 without releasing the hand from the main transmission lever 290. Further, when the tractor 1 is made to turn or travel rearward only by operating the mode change-over switch 232 of the main transmission lever 290, it is possible to easily adjust the traveling speed to an optimally preset value.

As shown in FIGS. 7 and 9, the working unit position dial (elevating dial) 300 is fitted into a substantially circular dent (side surface notch) 288 in a right side surface (side surface on the side of fenders 19) in the extending portion 282 of the arm rest 259. The dent 288 has a circular recess 288a which is formed by recessing the right side surface of the extending portion 282, and the working unit position dial 300 is turnably fitted into the circular recess 288a. The dent 288 has a recess 288b formed by recessing a portion of an upper side of the circular recess 288a up to an upper surface of the extending portion 282, and front and rear step portions of the recess 288b become rotation-restricting portions 289a and 289b which restrict rotation of the working unit position dial 300.

The working unit position dial 300 is fitted into the dent 288 such that the working unit position dial 300 is pivotally supported by a center of the circular recess 288a of the dent 288, the working unit position dial 300 has a knob (operating projection) 302 formed on an outer peripheral surface 301 on the side of the upper surface of the extending portion 282, and the knob 302 projects outward (upward). That is, the knob 302 is fitted into the recess 288b on the upper side of the dent 288, and the operator can check the knob 302 of the working unit position dial 300 from an upper side of the arm rest 259.

Even if the knob 302 is located at the highest position of the working unit position dial 300, an upper end of the knob 302 is lower than the upper surface of the extending portion 282. If the knob 302 abuts against the rotation-restricting portion 289a, forward (in clockwise direction in FIG. 9) rotation of the working unit position dial 300 is restricted, and if the knob 302 abuts against the rotation-restricting portion 289b, rearward (in counterclockwise direction in FIG. 9) rotation of the working unit position dial 300 is restricted. Therefore, when the main transmission lever 290 is operated, it is possible not only to prevent the operator from touching the working unit position dial 300 by mistake, but it is also possible to restrict the rotation region within a predetermined width when the working unit position dial 300 is operated.

When the working unit position dial 300 is fitted into the dent 288, the working unit position dial 300 projects outward (toward fenders 19) more than a right side surface of the extending portion 282. Thus, the operator can rotate the working unit position dial 300 by moving the knob 302 forward and rearward with fingers from the upper side of the arm rest 259, and even if the operator grasps the outer peripheral surface from the right side (from fenders 19) of the arm rest 259, it is possible to rotate the working unit position dial 300. Therefore, the operator can easily operate the working unit position dial 300 in a state where the arm is placed on the upper surface lid 287 (on arm rest 259).

If the working unit position dial 300 is rotated forward (clockwise direction in FIG. 9), the control solenoid valve 121 carries out the switching operation, a single acting type hydraulic cylinder (not shown) is shortened and driven, and a lift arm 193 (see FIG. 1) is turned downward. As a result, the rotary cultivator 15 is lowered through the lower links 21. If the working unit position dial 300 is inclined rearward (counterclockwise direction in FIG. 9), the control solenoid valve 121 carries out the switching operation, and the single acting type hydraulic cylinder (not shown) is extended and driven, and the lift arm 193 is turned upward. As a result, the rotary cultivator 15 is hoisted through the lower links 21.

In this embodiment, the main transmission lever 290, the setting dial 226 and the selecting switch 227 are arranged on the upper surface of the extending portion 282 which is a front portion of the arm rest 259, and the working unit position dial 300 is arranged on the side surface of the extending portion 282. The main transmission lever 290, the setting dial 226 and the selecting switch 227 are arranged on the left side (on the side of cockpit 8) of the extending portion 282, and the working unit position dial 300 is arranged on the right side (on the side of fenders 19) of the extending portion 282. Therefore, even during driving of the tractor 1, the operator can easily discriminate between the traveling system operating means and the working system operating means, and this is effective for preventing a wrong operation. Further, since the main transmission lever 290, the setting dial 226 and the selecting switch 227 which are the traveling system operating means are collectively arranged, the operability (handling performance) is excellent.

If the hand on the arm rest 259 is moved in the lateral direction around the elbow as a fulcrum, the hand easily reaches the main transmission lever 290 and the working unit position dial 300. Therefore, there is an advantage that it is possible to operate the main transmission lever 290 and the working unit position dial 300 only by a hand on the arm rest 259. When the arm is placed on the arm rest 259, it is possible to operate the main transmission lever 290 and the working unit position dial 300 on the extending portion 282 with a natural hand attitude in which a wrist does not bend downward. Hence, operability of the main transmission lever 290 and the working unit position dial 300 is remarkably enhanced, and the hand is stably supported.

A detailed structure of an arm rest 259 according to a second embodiment will be described with reference to FIGS. 11 to 13. The arm rest 259 of the second embodiment includes a base (arm rest rear portion) 281 which extends long in a longitudinal direction of the arm rest 259, and an extending portion (arm rest front portion) 282 which extends forward from the base 281. The extending portion 282 is arranged such that it bends in a direction (right direction in this embodiment) separating away from a cockpit 8 with respect to the base 281 which extends in parallel to the cockpit 8, and the arm rest 259 is formed into a substantially L-shape as a whole as viewed from above.

Figure 11:
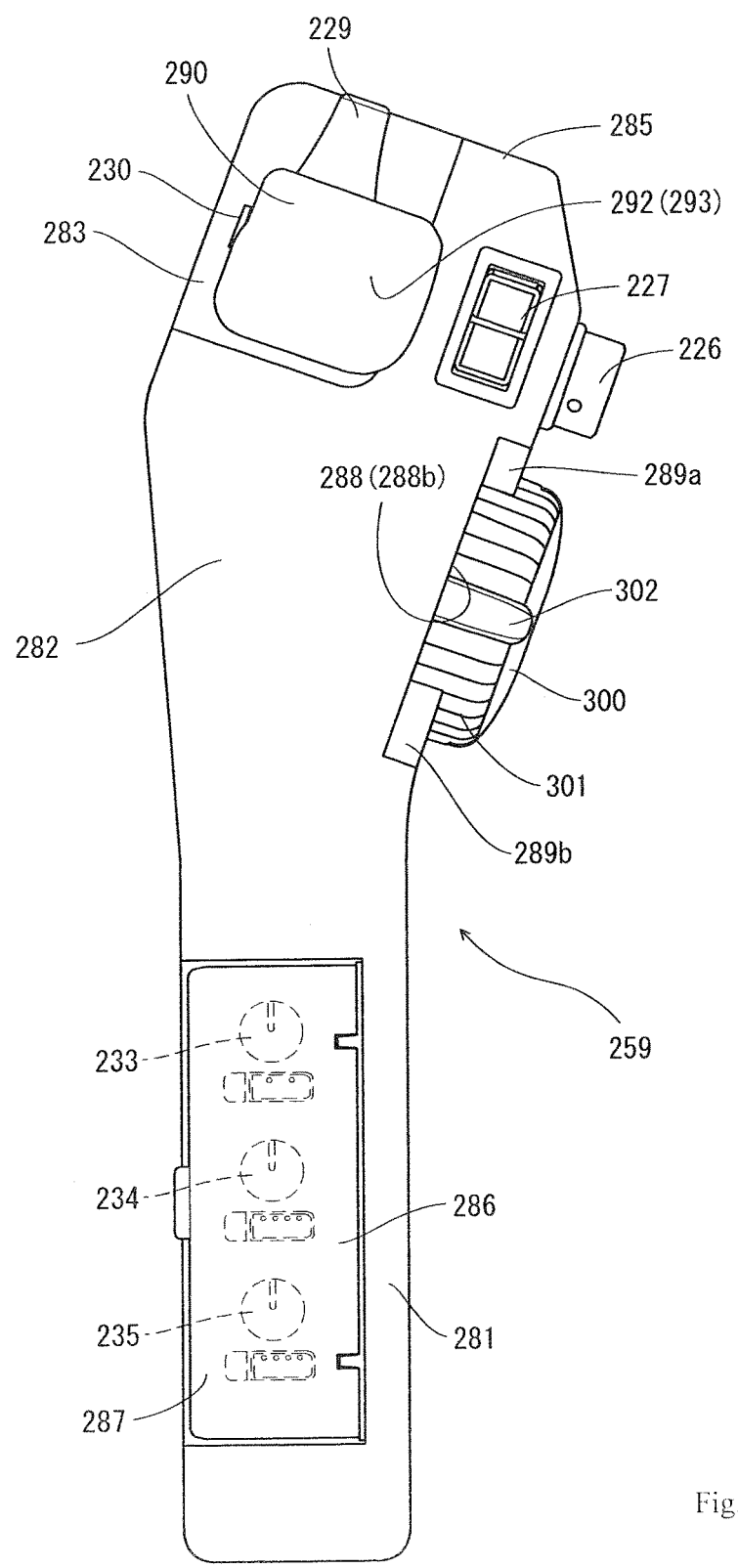
FIG. 11 is a plan view of an arm rest in a second embodiment.
Figure 12:
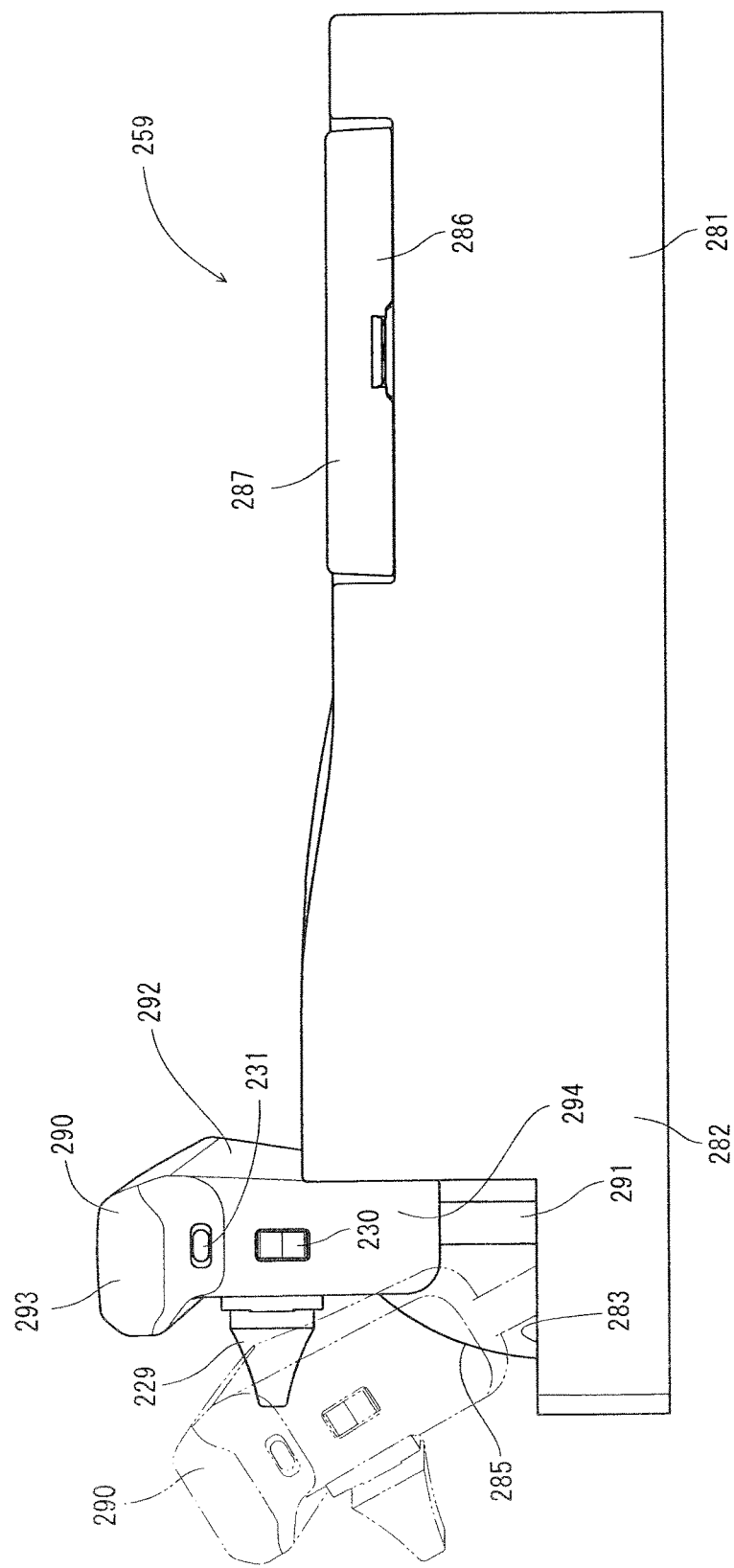
FIG. 12 is a left side view of the arm rest in the second embodiment.

As shown in FIGS. 11 and 12, the arm rest 259 includes a front notch 283 in a front end of the extending portion 282 on the side of the cockpit 8. The front notch 283 is recessed downward from an upper surface of the arm rest 259. The main transmission lever 290 projects from an upper surface of the front notch 283. As shown in FIGS. 11 and 13, a later-described rotation number/vehicle speed setting dial (setting dial) 226 is turnably pivotally supported on a front side (on the side of steering handle 9) on a right side surface of the extending portion 282 (side surface on the side of fenders 19). A later-described rotation number/vehicle speed selecting switch (selecting switch) 227 is arranged at a position on an upper surface of the extending portion 282 between the main transmission lever 290 and the rotation number/vehicle speed setting dial 226 (right side position of front notch 283).

With this configuration, even if an operator puts his or her arm or elbow on the base 281 of the arm rest 259 and operates the main transmission lever 290 or the working unit position dial 300 in front of the extending portion 282, it is possible to reduce fear that the operator unintentionally touches the setting dial 226 and the selecting switch 227 arranged closer to the fenders 19 than the main transmission lever 290. Therefore, it is possible to remarkably reduce or prevent a wrong operation of the setting dial 226 and the selecting switch 227.

The rotation number/vehicle speed setting dial 226 is for presetting maximum rotation speed of the engine 5 or maximum travelling speed of the traveling machine body 2. The rotation number/vehicle speed selecting switch 227 is for designating whether a value which is set by the rotation number/vehicle speed setting dial 226 is the maximum rotation speed of the engine 5 or the maximum traveling speed of the traveling machine body 2. The rotation number/vehicle speed selecting switch 227 is composed of a position-keeping type (alternate type) switch (position-keeping type rocker switch in example of this embodiment). With this configuration, if the rotation number/vehicle speed selecting switch 227 designates the rotation speed, the rotation number/vehicle speed setting dial 226 sets the maximum rotation speed of the engine 5. If the rotation number/vehicle speed selecting switch 227 designates the traveling speed, the rotation number/vehicle speed setting dial 226 sets the maximum traveling speed of the traveling machine body 2.

As shown in FIGS. 11 and 12, a switch box 286 is embedded in the base 281 of the arm rest 259 on the side of the back cockpit 8. An upper surface of the switch box 286 includes an upper surface lid 287 which opens toward a direction opposite from the cockpit 8. That is, the upper surface lid 287 is pivotally supported by a side edge which is on the opposite side from the cockpit 8 such that an axial direction of a rotation shaft of the upper surface lid 287 becomes equal to a longitudinal direction of the base 281. Therefore, when the upper surface lid 287 opens, since the inner side of the switch box 286 is opened from the side of the cockpit 8, the operator sitting on the cockpit 8 can easily operate. Normally, the upper surface lid 287 is closed, an upper surface of the upper surface lid 287 is located at the same height position as the upper surface of the base 281 of the arm rest 259, and the operator puts the arm or elbow on the upper surface lid 287.

The switch box 286 is arranged such that its longitudinal direction extends along a longitudinal direction of the base 281. An inner upper surface of the switch box 286 which is opposed to a lower surface of the upper surface lid 287 includes an inclination setting dial 233, a most-hoisted position setting dial 234 and a lowering speed setting dial 235. That is, when the upper surface lid 287 opens, the setting dials 233 to 235 are arranged on a line on the inner upper surface of the switch box 286. The inclination setting dial 233 is for presetting a target lateral inclination angle of the rotary cultivator 15 relative to the traveling machine body 2. The most-hoisted position setting dial 234 is for setting a most-hoisted position of the rotary cultivator 15. The lowering speed setting dial 235 is for setting speed when the rotary cultivator 15 is lowered for reducing the impact when the rotary cultivator 15 is lowered.

As shown in FIG. 12, the main transmission lever 290 includes a lever shaft 291, and a grip 292 grasped by the operator is mounted on an upper end of the lever shaft 291. A lower end of the lever shaft 291 is pivotally supported in the extending portion 282 which becomes a lower side of the front notch 283. Thus, the main transmission lever 290 can incline forward and rearward. That is, the main transmission lever 290 can incline forward and rearward from a substantially vertical attitude to a forward attitude. As shown in FIGS. 12 and 13, a front end surface of the extending portion 282 except the front notch 283 is composed of a forward curved surface 285 which is a substantially ¼ circular curved surface extending along a turning locus of the main transmission lever 290. Therefore, the grip 292 projects from the forward curved surface 285 of the extending portion 282 irrespective of an inclination attitude of the main transmission lever 290. With this configuration, since the operator's hand grasping the grip 292 does not touch the extending portion 282 of the arm rest 259, the operator can smoothly operate the main transmission lever 290.

When the main transmission lever 290 is inclined forward (toward steering handle 9), the main transmission potentio 222 inclines the pump swash plate 159 (see FIG. 5) toward a positive inclination angle side in accordance with an operation position of the main transmission lever 290, and the main transmission potentio 222 accelerates the traveling speed of the traveling machine body 2. When the main transmission lever 290 is inclined rearward (toward cockpit 8), the main transmission potentio 222 inclines the pump swash plate 159 (see FIG. 5) toward a negative inclination angle side in accordance with the operation position of the main transmission lever 290, and the main transmission potentio 222 decelerates the traveling speed of the traveling machine body 2.

The operator can operate the main transmission lever 290 in a state where the arm is put on the upper surface lid 287 (on arm rest 259). Therefore, it is extremely easy to operate the main transmission lever 290, and it is possible to exert a high effect for enhancing the travelling operability in the tractor 1. At this time, a position of the step portion 284 is a position on which the operator's wrist is not superposed almost at all as viewed from above in a state where the operator's arm is placed on the upper surface lid 287 (on arm rest 259). Therefore, the arm on the arm rest 259 does not unintentionally touch (does not hinder) the setting dial 226 and the selecting switch 227, and a wrong operation of the setting dial 226 and the selecting switch 227 can be reduced.

Figure 13:
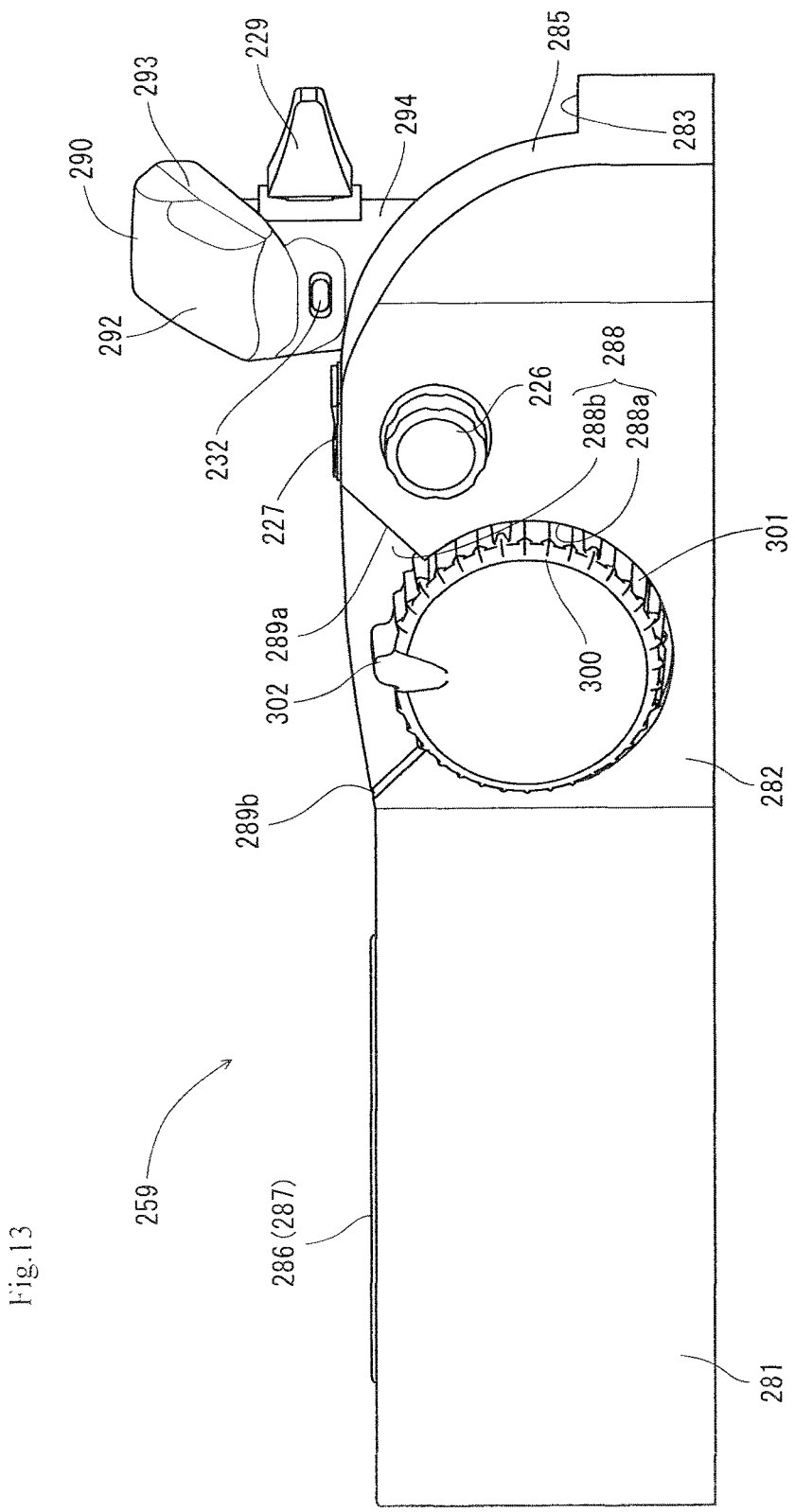
FIG. 13 is a right side view of the arm rest in the second embodiment.

As shown in FIGS. 11 to 13, the grip 292 of the main transmission lever 290 includes a grip portion 293, and an upper surface of the grip portion 293 is formed into a gently upward convex-curved surface. A portion of an upper surface of the grip portion 293 of the grip 292 on the side of the cockpit 8 is inclined such that the upper surface becomes an uppermost end so that the operator can easily grasp the grip portion 293 with a right hand. A lateral width of this grip portion 293 is narrowed toward (downward) a connection between the grip portion 293 and the lever shaft 291 as viewed from front. That is, the grip portion 293 is provided at its lower side with a narrow part. A lever connecting portion 294 which is to be connected to the lever shaft 291 is provided on the lower side of the grip portion 293 of the grip 292. A lateral width of the lever connecting portion 294 is equal to a lateral width of the lower side of the grip portion 293.

In the grip 292, the automatic elevating switch 229 is arranged on a front surface of the lever connecting portion 294, and the elevation finely adjusting switch 230 is arranged on a side surface (left side surface) of the lever connecting portion 294 on the side of the cockpit 8. In the grip portion 293 of the grip 292, the display change-over switch 231 is arranged on a narrow part surface on the side (left side) of the cockpit 8, and the mode change-over switch 232 is arranged on the narrow part surface on the opposite side (right side) of the cockpit 8. The automatic elevating switch 229 is for forcibly hoisting and lowering the rotary cultivator 15 to a predetermined height. The elevation finely adjusting switch 230 is for finely adjusting a height position of the rotary cultivator 15. The display change-over switch 231 is for switching between the display contents of the liquid crystal panel 330. The mode change-over switch 232 is for changing and adjusting the traveling speed when the tractor turns and travels rearward.

The automatic elevating switch 229 is a self-reset type (momentary type) lever switch which inclines in the vertical direction. When the automatic elevating switch 229 is inclined upward, the rotary cultivator 15 is hoisted to a most-hoisted position which is set by the most-hoisted position setting dial 234, and when the automatic elevating switch 229 is inclined downward, the rotary cultivator 15 is lowered to a position which is set by the working unit position dial 300. The elevation finely adjusting switch 230 is composed of a self-reset type (momentary type) rocker switch, and the rotary cultivator 15 is hoisted and lowered only while the elevation finely adjusting switch 230 is operated.

Since the main transmission lever 290 includes the automatic elevating switch 229, the elevation finely adjusting switch 230, the display change-over switch 231 and the mode change-over switch 232, the operator can easily perform control in accordance with a traveling situation only by operating the main transmission lever 290 with the right hand. That is, it is possible to adjust a height position of the rotary cultivator 15 by operating the automatic elevating switch 229 and the elevation finely adjusting switch 230 while carrying out the inclining operation of the main transmission lever 290. Even when the operator desires to switch between the display contents of the liquid crystal panel 330, the operator only needs to operate the display change-over switch 231 without releasing the hand from the main transmission lever 290. Further, when the tractor 1 is made to turn or travel rearward only by operating the mode change-over switch 232 of the main transmission lever 290, it is possible to easily adjust the traveling speed to an optimally preset value.

As shown in FIGS. 11 and 13, the working unit position dial (elevating dial) 300 is fitted into a substantially circular dent (side surface notch) 288 behind the rotation number/vehicle speed setting dial (setting dial) 226 in a right side surface (side surface on the side of fenders 19) in the extending portion 282 of the arm rest 259. That is, the rotation number/vehicle speed setting dial 226 is arranged in front of the working unit position dial 300 in a right side surface of the arm rest 259. The rotation number/vehicle speed selecting switch 227 is arranged on the upper surface of the arm rest 259 at a position between the main transmission lever 290 and the rotation number/vehicle speed setting dial 226.

The dent 288 has a circular recess 288a which is formed by recessing the right side surface of the extending portion 282, and the working unit position dial 300 is turnably fitted into the circular recess 288a. The dent 288 has a recess 288b formed by recessing a portion of an upper side of the circular recess 288a up to an upper surface of the extending portion 282, and front and rear step portions of the recess 288b become rotation-restricting portions 289a and 289b which restrict rotation of the working unit position dial 300.

The working unit position dial 300 is fitted into the dent 288 such that the working unit position dial 300 is pivotally supported by a center of the circular recess 288a of the dent 288, the working unit position dial 300 has a knob (operating projection) 302 provided on the outer peripheral surface 301 on the side of the upper surface of the extending portion 282, and the knob 302 projects outward (upward). That is, the knob 302 is fitted into the recess 288b on the upper side of the dent 288, and the operator can check the knob 302 of the working unit position dial 300 from an upper side of the arm rest 259.

Even if the knob 302 is located at the highest position of the working unit position dial 300, an upper end of the knob 302 is lower than the upper surface of the extending portion 282. If the knob 302 abuts against the rotation-restricting portion 289a, forward (in clockwise direction in FIG. 13) rotation of the working unit position dial 300 is restricted, and if the knob 302 abuts against the rotation-restricting portion 289b, rearward (in counterclockwise direction in FIG. 13) rotation of the working unit position dial 300 is restricted. Therefore, when the main transmission lever 290 is operated, it is possible not only to prevent the operator from unintentionally touching the working unit position dial 300, but it is also possible to restrict the rotation region within a predetermined width when the working unit position dial 300 is operated.

When the working unit position dial 300 is fitted into the dent 288, the working unit position dial 300 projects outward (toward fenders 19) more than a right side surface of the extending portion 282. Thus, the operator can rotate the working unit position dial 300 by moving the knob 302 back and forth with fingers from the upper side of the arm rest 259, and even if the operator grasps the outer peripheral surface from the right side (fenders 19 side) of the arm rest 259, it is possible to rotate the working unit position dial 300. Therefore, the operator can easily operate the working unit position dial 300 in a state where the arm is placed on the upper surface lid 287 (on arm rest 259).

If the working unit position dial 300 is rotated forward (clockwise direction in FIG. 13), the control solenoid valve 121 carries out the switching operation, a single acting type hydraulic cylinder (not shown) is shortened and driven, and a lift arm 193 (see FIG. 1) is turned downward. As a result, the rotary cultivator 15 is lowered through the lower links 21. If the working unit position dial 300 is inclined rearward (counterclockwise direction in FIG. 13), the control solenoid valve 121 carries out the switching operation, and the single acting type hydraulic cylinder (not shown) is extended and driven, and the lift arm 193 is turned upward. As a result, the rotary cultivator 15 is hoisted through the lower links 21.

In this embodiment, the main transmission lever 290, the setting dial 226 and the selecting switch 227 are arranged from the upper surface to the side surface of a front end of the extending portion 282 which is a front portion of the arm rest 259, and the working unit position dial 300 is arranged behind the side surface of the extending portion 282. Therefore, even during driving of the tractor 1, the operator can easily discriminate between the traveling system operating means and the working system operating means, and this is effective for preventing a wrong operation. Further, since the main transmission lever 290, the setting dial 226 and the selecting switch 227 which are the traveling system operating means are collectively arranged, the operability (handling performance) is excellent.

If the hand on the arm rest 259 is moved in the lateral direction around the elbow as a fulcrum, the hand easily reaches the main transmission lever 290 and the working unit position dial 300. Therefore, there is a merit that it is possible to operate the main transmission lever 290 and the working unit position dial 300 only with a hand on the arm rest 259. When the arm is placed on the arm rest 259, it is possible to operate the main transmission lever 290 and the working unit position dial 300 on the extending portion 282 with a natural hand attitude in which a wrist does not bend downward. Hence, operability of the main transmission lever 290 and the working unit position dial 300 is remarkably enhanced, and the hand is stably supported.

The invention of the present application is not limited to the above-described first to third embodiments, and the invention can be embodied in various modifications. For example, the invention of the present application is not limited to the tractor, and the invention can be applied also to an agricultural working machine such as a rice transplanter and a combined harvester, and a special working vehicle such as a wheel loader. The engine 5 provided in the traveling machine body 2 is not limited to a diesel engine, and the engine may be a gasoline engine.

The arm rest 259 need not be provided on the right side of the cockpit 8, and may be provided on the left side of the cockpit 8. When the arm rest 259 provided with the various kinds of operating means is provided on one of the right and left sides of the cockpit 8, an arm rest having no operating means may be provided on the other side of the cockpit 8. Further, as described in FIG. 14, the front end surface of the extending portion 282 of the arm rest 259 may not be provided with the front notch 283 of the above-described embodiments, and the entire front end surface may be composed of the forward curved surface 285 which is a substantially ¼ circular curved surface.

Structures of the other various parts are not limited to the illustrated embodiments, and the structures can variously be changed within a range not departing from the subject matters of the invention.

REFERENCE SIGNS LIST

1 Tractor
2 Traveling machine body
5 Engine
6 Hood
7 Cabin
8 Cockpit
9 Steering handle
224 Cultivating depth setting dial
225 PTO clutch switch
226 Rotation number/vehicle speed setting dial
227 Rotation number/vehicle speed selecting switch
228 Inclination manual switch
229 Automatic elevating switch
230 Elevation finely adjusting switch
231 Display change-over switch
232 Mode change-over switch
233 Inclination setting dial
234 Most-hoisted position setting dial
235 Lowering speed setting dial
245 Steering column
246 Meter panel
259 Arm rest
260 Operation stage
281 Base
282 Extending portion
283 Front notch
284 Step portion
285 Forward curved surface
286 Switch box
287 Upper surface lid
288 Dent
288a Circular recess
288b Recess
289a Rotation-restricting portion
289b Rotation-restricting portion
290 Main transmission lever
300 Working unit position dial
301 Outer peripheral surface
302 Knob

The invention claimed is:

1. A working vehicle in which speed of power from an engine provided in a traveling machine body is changed by a hydraulic continuously variable transmission and transmitted to a traveling unit and a working unit, wherein, the working vehicle comprising: an arm rest on which an arm and a hand of an operator are put is placed lateral to a cockpit in the traveling machine body, wherein
a main transmission lever for changing traveling speed by the traveling unit is arranged on a front end of the arm rest close to the cockpit, and an elevating dial for hoisting and lowering the working unit is arranged on a side surface of the arm rest on an opposite side from the cockpit.

2. The working vehicle according to claim 1, wherein the main transmission lever projects from the front end of the arm rest on the side of the cockpit, and a front surface of the arm rest is formed into a curved surface corresponding to a turning locus of the main transmission lever.

3. The working vehicle according to claim 1, wherein the elevating dial is fitted to a side surface of the arm rest such that an upper end of the elevating dial is located lower than an upper surface of the arm rest,
a side notch for operating a dial is provided in the side surface of the arm rest above an installation region of the elevating dial, an operating projection is provided above the elevating dial, and
front and rear step portions of the side notch are brought into abutment against the operating projection, thereby configuring the step portions as a rotation-restricting portion which restricts rotation of the elevating dial.

4. The working vehicle according to claim 1, wherein a rear portion of the arm rest is parallel to the cockpit, and a front portion of the arm rest is separated from the cockpit toward a front end.

5. The working vehicle according to claim 1, wherein arranged on the upper surface of the arm rest at a position behind the main transmission lever and on the side of the cockpit are a setting dial for setting a value of maximum speed of the traveling speed or a maximum rotation number of the engine, and a selecting switch for selecting whether the value set by the setting dial is the maximum speed of the traveling speed and the maximum rotation number of the engine.

* * * * *